(12) United States Patent
Nambara et al.

(10) Patent No.: US 11,838,467 B2
(45) Date of Patent: Dec. 5, 2023

(54) DOCUMENT PLACEMENT DETECTING DEVICE, IMAGE READING DEVICE, IMAGE FORMING APPARATUS, METHOD, AND NON-TRANSITORY RECORDING MEDIUM

(71) Applicants: Kohsuke Nambara, Kanagawa (JP); Hiroki Shirado, Kanagawa (JP)

(72) Inventors: Kohsuke Nambara, Kanagawa (JP); Hiroki Shirado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/103,510

(22) Filed: Jan. 31, 2023

(65) Prior Publication Data

US 2023/0283726 A1   Sep. 7, 2023

(30) Foreign Application Priority Data

Mar. 7, 2022   (JP) .................................. 2022-034628

(51) Int. Cl.
*H04N 1/00* (2006.01)

(52) U.S. Cl.
CPC ..... *H04N 1/00689* (2013.01); *H04N 1/00708* (2013.01); *H04N 1/00737* (2013.01); *H04N 1/00801* (2013.01)

(58) Field of Classification Search
CPC ........... H04N 1/00689; H04N 1/00708; H04N 1/00737; H04N 1/00801
USPC ....................................................... 358/488
See application file for complete search history.

(56) References Cited

U.S. PATENT DOCUMENTS

| | | | |
|---|---|---|---|
| 5,124,810 A | 6/1992 | Seto | |
| 8,259,316 B2 * | 9/2012 | Yanagawase | H04N 1/00734 358/475 |
| 2011/0205601 A1 * | 8/2011 | Akimoto | G03G 21/046 358/475 |
| 2012/0057211 A1 | 3/2012 | Shirado | |
| 2014/0043629 A1 | 2/2014 | Shirado | |
| 2016/0119495 A1 | 4/2016 | Konno et al. | |
| 2016/0219163 A1 | 7/2016 | Shirado et al. | |
| 2017/0019567 A1 | 1/2017 | Konno et al. | |
| 2017/0302821 A1 | 10/2017 | Sasa et al. | |
| 2018/0139345 A1 | 5/2018 | Goh et al. | |
| 2018/0146150 A1 | 5/2018 | Shirado et al. | |

(Continued)

FOREIGN PATENT DOCUMENTS

| | | |
|---|---|---|
| JP | 2-311083 | 12/1990 |
| JP | 2005-027122 | 1/2005 |
| JP | 2018-186381 | 11/2018 |

*Primary Examiner* — Allen H Nguyen
(74) *Attorney, Agent, or Firm* — XSENSUS LLP

(57) ABSTRACT

A document placement detecting device includes a document table, a plate, a plurality of invisible light sources, an imaging device, and circuitry. The document table transmits light. The plate is openable and closable relative to the document table, and covers the document table in a closed state of the plate. The plurality of invisible light sources irradiate a placement area with invisible light via the document table. The placement area is an area of the document table on which a document is placed. The imaging device receives reflected light from the document, and outputs read data. The circuitry detects the placement of the document with a change in a read value of the read data output from the imaging device based on the irradiation with the invisible light.

15 Claims, 21 Drawing Sheets

(56) References Cited

U.S. PATENT DOCUMENTS

| | | |
|---|---|---|
| 2018/0175096 A1 | 6/2018 | Inoue et al. |
| 2018/0213124 A1 | 7/2018 | Yokohama et al. |
| 2020/0120224 A1 | 4/2020 | Sasa et al. |
| 2020/0120225 A1 | 4/2020 | Oyama et al. |
| 2020/0120228 A1 | 4/2020 | Ozaki et al. |
| 2020/0137262 A1 | 4/2020 | Kubo et al. |
| 2020/0244837 A1 | 7/2020 | Tsukahara et al. |
| 2020/0252513 A1 | 8/2020 | Nakada et al. |
| 2020/0296255 A1 | 9/2020 | Hashimoto et al. |
| 2020/0336615 A1 | 10/2020 | Ono et al. |
| 2021/0099614 A1 | 4/2021 | Ozaki et al. |
| 2022/0109778 A1 | 4/2022 | Nambara et al. |
| 2022/0407983 A1 | 12/2022 | Shirado et al. |
| 2023/0179729 A1* | 6/2023 | Hamada ............. H04N 1/00708 358/1.2 |

* cited by examiner

DOCUMENT PLACEMENT DETECTING DEVICE, IMAGE READING DEVICE, IMAGE FORMING APPARATUS, METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-034628, filed on Mar. 7, 2022, in the Japan Patent Office, the entire disclosure of which is hereby incorporated by reference herein.

BACKGROUND

Technical Field

Embodiments of this disclosure relate to a document placement detecting device, an image reading device, an image forming apparatus, a method, and a non-transitory recording medium.

Related Art

According to a typical image reading device, when a user places a document on a reading surface of the image reading device, the image reading device detects the placement of the document and starts an operation of detecting the size of the document.

For example, according to a technique disclosed in Japanese Unexamined Patent Application Publication No. 2018-186381, when a first angle detector turns on during the closure of a pressure plate (i.e., platen cover), the size in the sub-scanning direction of the document is determined with a reflective sensor using invisible light. Then, when a second angle detector turns on, the size in the main scanning direction of the document is determined in accordance with the reading result of visible light.

According to the above-described technique, however, the detection of the document size starts after the pressure plate is completely closed, depending on the document size. Specifically, it is after the pressure plate is completely closed and a light source unit moves to the home position thereof that the detection of the document size starts, consequently delaying the start of an operation such as copying or scanning.

SUMMARY

In one embodiment of this invention, there is provided a document placement detecting device that includes, for example, a document table, a plate, a plurality of invisible light sources, an imaging device, and circuitry. The document table transmits light. The plate is openable and closable relative to the document table, and covers the document table in a closed state of the plate. The plurality of invisible light sources irradiate a placement area with invisible light via the document table. The placement area is an area of the document table on which a document is placed. The imaging device receives reflected light from the document, and outputs read data. The circuitry detects the placement of the document with a change in a read value of the read data output from the imaging device based on the irradiation with the invisible light.

In one embodiment of this invention, there is provided an image reading device that includes, for example, the above-described document placement detecting device and a plurality of visible light sources. The plurality of visible light sources irradiate the document with visible light via the document table.

In one embodiment of this invention, there is provided an image forming apparatus that includes, for example, the above-described image reading device and an image forming device. The image reading device reads the document. The image forming device forms an image based on read data read from the document by the image reading device.

In one embodiment of this invention, there is provided a method of detecting placement of a document with a document placement detecting device. The document placement detecting device includes a document table and a plate. The document table transmits light. The plate is openable and closable relative to the document table, and covers the document table in a closed state of the plate. The method includes, for example, irradiating a placement area with invisible light via the document table. The placement area is an area of the document table on which the document is placed. The method further includes receiving reflected light from the document with an imaging device, outputting read data from the imaging device, and detecting the placement of the document with a change in a read value of the read data output from the imaging device based on the irradiation with the invisible light.

In one embodiment of this invention, there is provided a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
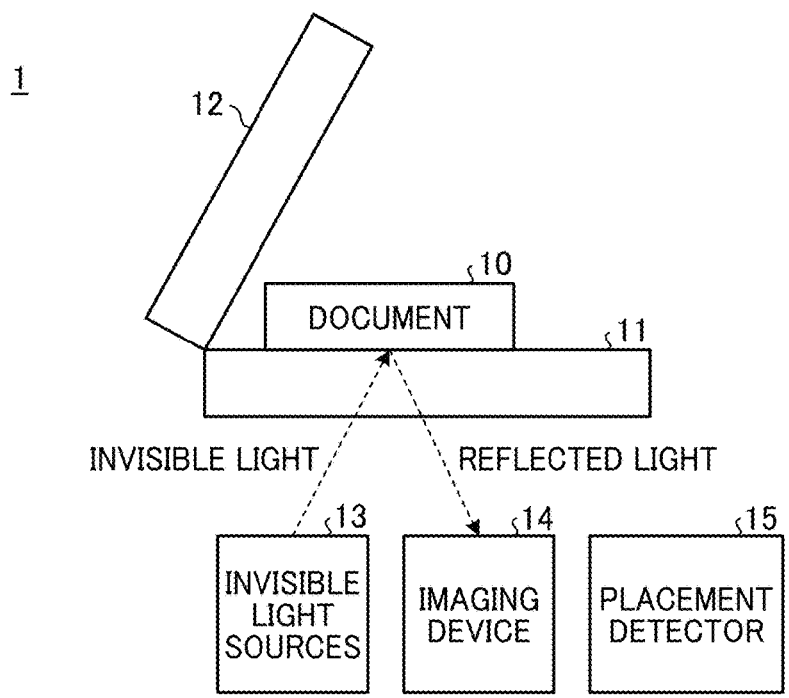
FIG. 1 is a schematic diagram illustrating an exemplary configuration of a document placement detecting device according to a first embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, a document placement detecting device, an image reading device, an image forming apparatus, a method, and a non-transitory recording medium according to embodiments of the present disclosure are described below. As used herein, the singular forms "a," "an." and "the" are intended to include the plural forms as well, unless the context clearly indicates otherwise.

A document placement detecting device according to a first embodiment of the present invention detects the placement of a document by constantly monitoring image data obtained with invisible light sources. The invisible light sources are included in an image reading device that stands by on the upstream side in a sub-scanning direction B (see FIG. 4) before the start of a document reading operation.

A description will be given of a specific configuration of the document placement detecting device of the first embodiment.

FIG. 1 is a schematic diagram illustrating an exemplary configuration of the document placement detecting device of the first embodiment. The document placement detecting device is applied to the image reading device or an image forming apparatus including the image reading device, as described later. As illustrated in FIG. 1, a document placement detecting device 1 includes a transparent document table 11, a pressure plate 12, invisible light sources 13, an imaging device 14, and a placement detector 15. The document table 11 is a table on which a document 10 is placed. The pressure plate 12 is used to cover the document table 11. The invisible light sources 13 irradiate the document with invisible light. The imaging device 14 reads the document 10. The placement detector 15 detects the placement of the document 10.

Herein, the transparent document table 11 is an example of a document table that transmits light. The pressure plate 12 for covering the document table 11 is an example of a plate openable and closable relative to the document table, and covering the document table in a closed state of the plate.

Figure 2:
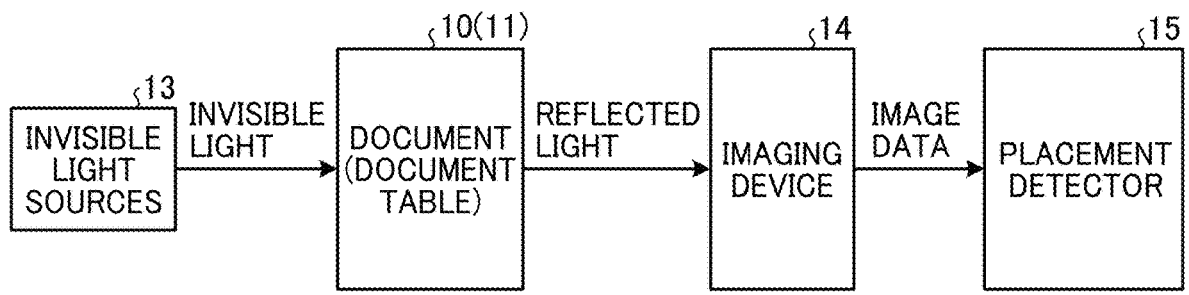
FIG. 2 is a diagram illustrating an exemplary detecting operation of the document placement detecting device of the first embodiment.

FIG. 2 is a diagram illustrating an exemplary detecting operation of the document placement detecting device 1. As illustrated in FIG. 2, in the document placement detecting device 1, the invisible light sources 13 emit invisible light toward the document table 11, and the imaging device 14 receives reflected light of the invisible light and outputs read data. Then, based on a read value of the read data, the placement detector 15 determines whether the document 10 is placed on the document table 11. The read data is image data, for example. In the following description, the read data is assumed to be image data.

When the document 10 is placed on the document table 11 in the above-described state, the invisible light is reflected by the document 10, changing the read value of the image data. Based on the change in the read value of the image data output from the imaging device 14, the placement detector 15 detects the placement of the document 10. The placement detector 15 is implemented by circuitry, such as a central processing unit (CPU), which is a control circuit of the document placement detecting device 1 (e.g., a control circuit 200 in FIG. 26).

For example, if the read value of the image data is equal to or greater than a previously set first threshold value, the placement detector 15 detects that the document 10 is placed on the document table 11.

The read value of the image data also changes when the pressure plate 12 is closed without the document 10 on the document table 11, as well as when the document 10 is placed on the document table 11. Therefore, a second threshold value is set to prevent the change in the read value due to the closure of the pressure plate 12 without the document 10 on the document table 11 from being erroneously detected as the change in the read value due to the placement of the document 10 on the document table 11.

For example, the second threshold value is set to the difference between the read value of the image data obtained with the document 10 on the document table 11 and the read value of the image data obtained with the pressure plate 12 closed without the document 10 on the document table 11. If the read value of the image data is equal to or greater than the first threshold value, and if the difference between the read value of the image data obtained during a document placement detecting operation and the read value of the image data obtained with the pressure plate 12 closed without the document 10 on the document table 11 is equal to or greater than the second threshold value, the placement detector 15 determines the placement of the document 10.

The first threshold value and the second threshold value are stored in an internal memory of the document placement detecting device 1.

Figure 3:
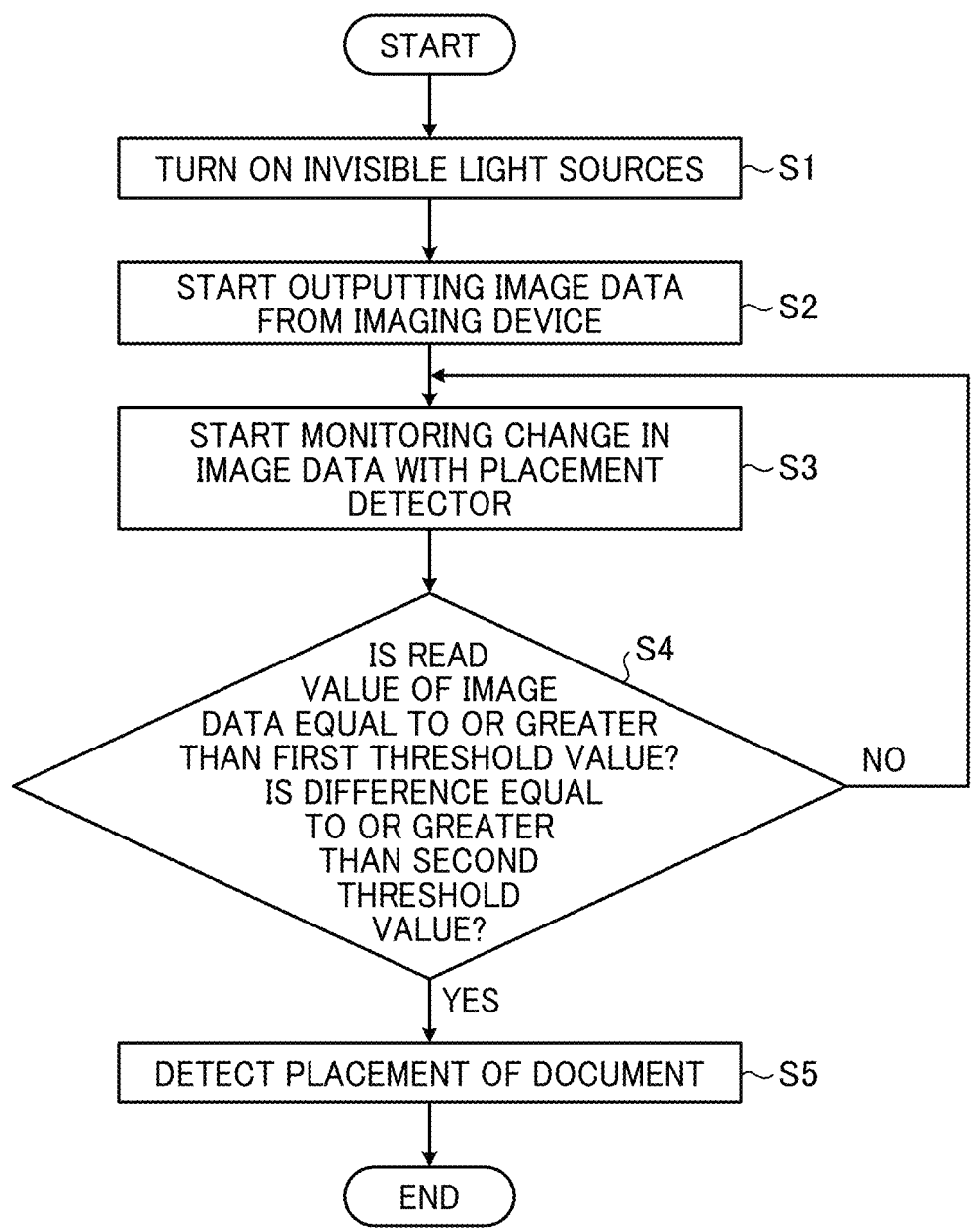
FIG. 3 is a flowchart illustrating an exemplary operation of the document placement detecting device of the first embodiment.

FIG. 3 is a flowchart illustrating an exemplary operation of the document placement detecting device 1 of the first embodiment. The operation of FIG. 3 is executed by circuitry, such as a CPU, which is the control circuit of the document placement detecting device 1 (e.g., the control circuit 200 in FIG. 26 and an image sensor 140 in FIG. 26 controlled by the control circuit 200). The same applies to the operations illustrated in subsequent flowcharts.

The document placement detecting device 1 first turns on the invisible light sources 13 (step S1), and starts outputting the image data from the imaging device 14 (step S2).

The document placement detecting device 1 further starts monitoring the change in the image data with the placement detector 15 (step S3). The document placement detecting device 1 then determines whether the read value of the image data is equal to or greater than the first threshold value, and whether the difference between the read value of the image data obtained during the document placement detecting operation and the read value of the image data obtained with the pressure plate 12 closed without the document 10 on the document table 11 is equal to or greater than the second threshold value (step S4).

If the two conditions of step S4 are not met (NO at step S4), the document placement detecting device 1 returns to step S3 to continue monitoring the change in the image data.

If the two conditions of step S4 are met (YES at step S4), the document placement detecting device 1 detects the placement of the document 10.

Figure 4:
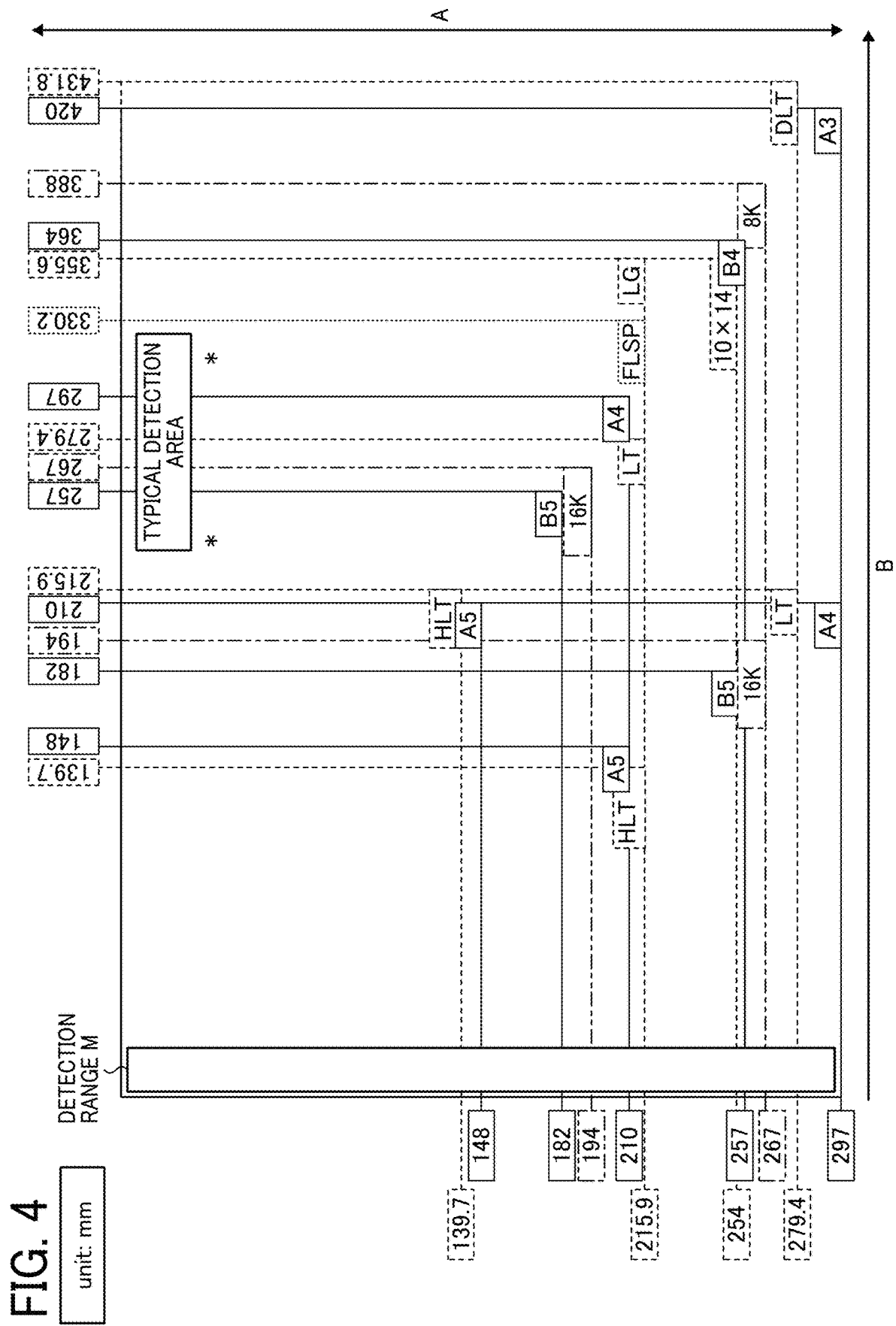
FIG. 4 is a diagram illustrating a detection range of the document placement detecting device of the first embodiment.

FIG. 4 is a diagram illustrating the detection range of the document placement detecting device 1. FIG. 4 is a plan view of the document table 11 as viewed from above, illustrating standard sizes of the document 10, including A3, A4, A5, B4, B5, letter (LT), half letter (HLT), double letter (DLT), legal (LG), foolscap (FLSP), 8K, and 16K. FIG. 4 also illustrates a typical detection area for the purpose of comparison. FIG. 4 further illustrates a main scanning direction A and a sub-scanning direction B. The document placement detecting device 1 irradiates a detection range M in FIG. 4 with the invisible light sources 13, and monitors the change in the image data in the detection range M. The detection range M is included in a document placement area covering all standard sizes of the document 10, and is set to span one side of the document table 11 in order to detect all standard sizes of the document 10, for example. For instance, the document placement detecting device 1 irradiates the detection range M with the invisible light sources 13 standing by on the upstream side in the sub-scanning direction B, and monitors the change in the image data.

The detection range M may be any range in which the document 10 of any standard size placed at a specified position thereof is detectable. For example, the detection range M is set to the range in which the document 10 is detectable whether the document 10 is placed vertically or horizontally.

Consequently, the placement of the document 10 is detected in real time regardless of the size of the document 10. Further, even if the pressure plate 12 is open during the document placement detecting operation, the invisible light does not cause a user to feel glare, allowing the user to place or adjust the document 10 on the document table 11, for example, during the document placement detecting operation.

The first embodiment may be modified as in a first modified example described below.

Figure 5:
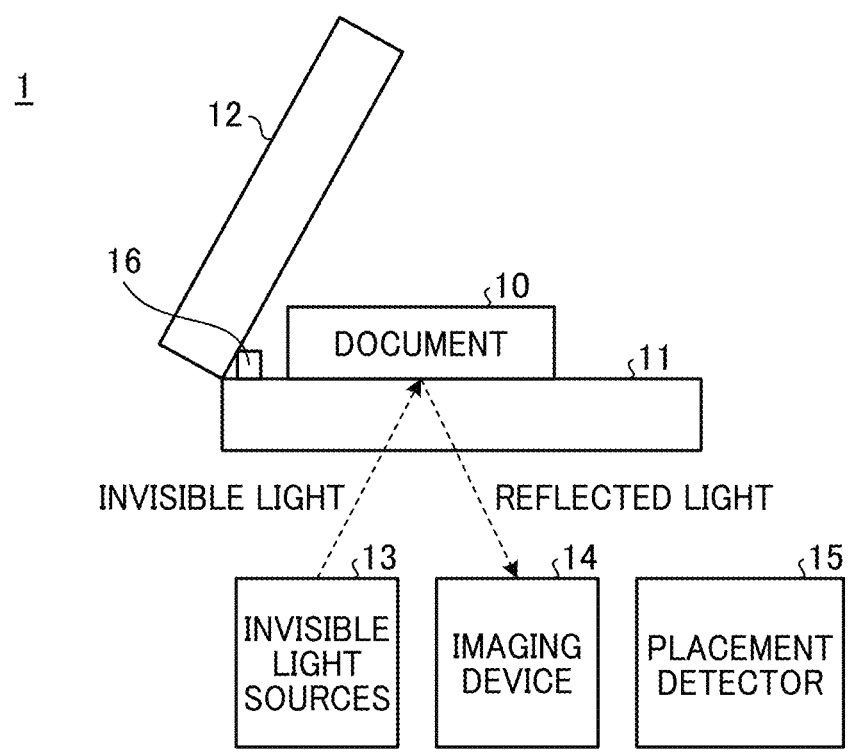
FIG. 5 is a diagram illustrating an exemplary configuration of a document placement detecting device according to a first modified example of the first embodiment.

FIG. 5 is a diagram illustrating an exemplary configuration of the document placement detecting device 1 according to the first modified example of the first embodiment. The document placement detecting device 1 illustrated in FIG. 5 includes an opening and closing sensor 16 that detects whether the pressure plate 12 is in the open state or in the closed state. In response to the detection by the opening and closing sensor 16 of the open state of the pressure plate 12, the document placement detecting device 1 executes the document placement detecting operation in the open state of the pressure plate 12. Specifically, triggered by the detection of the open state of the pressure plate 12 by the opening and closing sensor 16, the document placement detecting device 1 starts the document placement detecting operation. Further, triggered by the detection of the closed state of the pressure plate 12 by the opening and closing sensor 16, the document placement detecting device 1 ends the document placement detecting operation.

Figure 6:
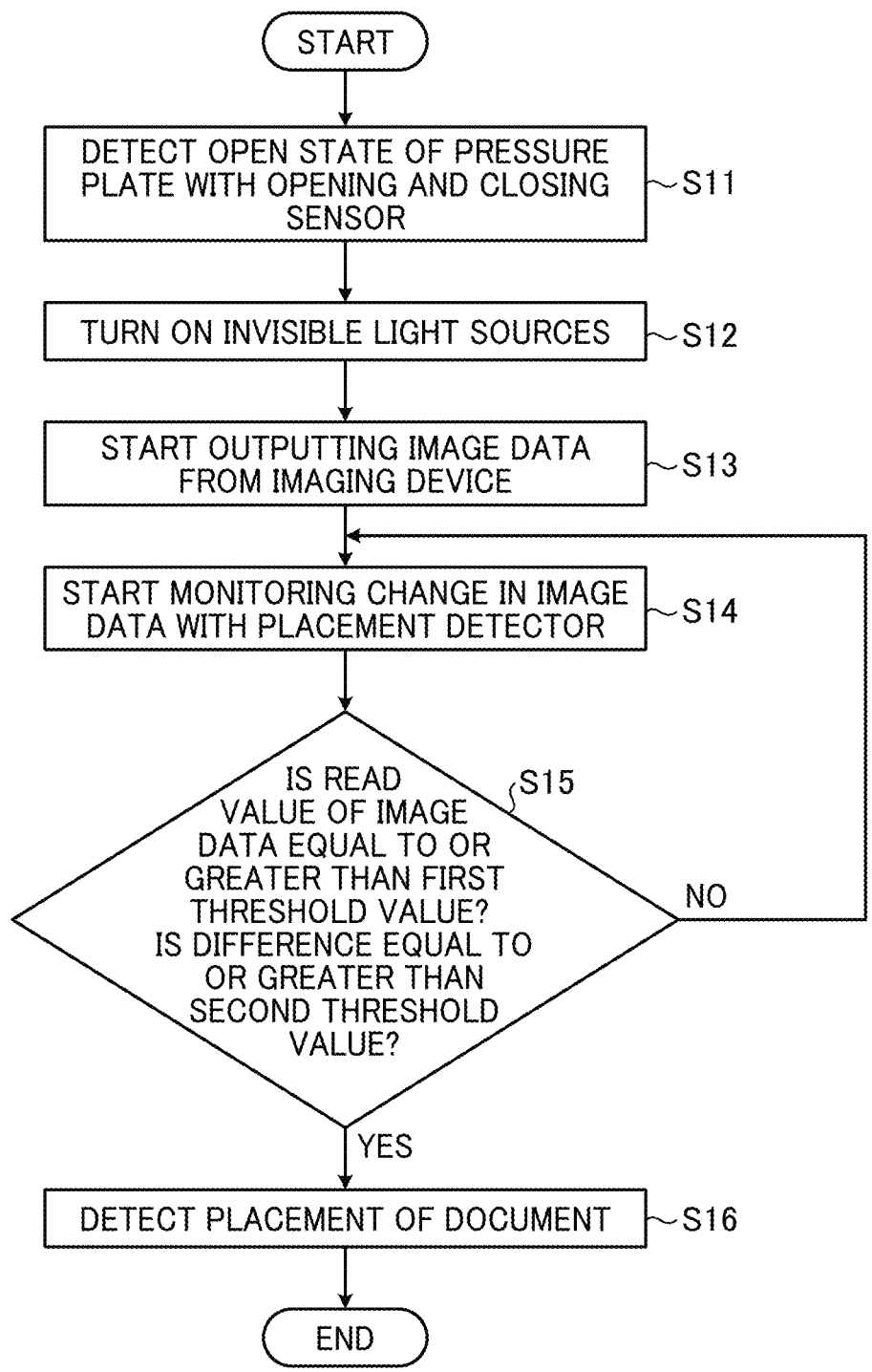
FIG. 6 is a flowchart illustrating an exemplary operation of the document placement detecting device according to the first modified example of the first embodiment.

FIG. 6 is a flowchart illustrating an exemplary operation of the document placement detecting device 1 according to the first modified example of the first embodiment. With the opening and closing sensor 16, the document placement detecting device 1 detects that the pressure plate 12 is open (step S11). Then, the document placement detecting device 1 starts the document placement detecting operation including steps S12, S13, S14, S15, and S16. The processes of steps S12 to S16 correspond to those of steps S1 to S5 in FIG. 3, and thus description thereof will be omitted.

Figure 7A:
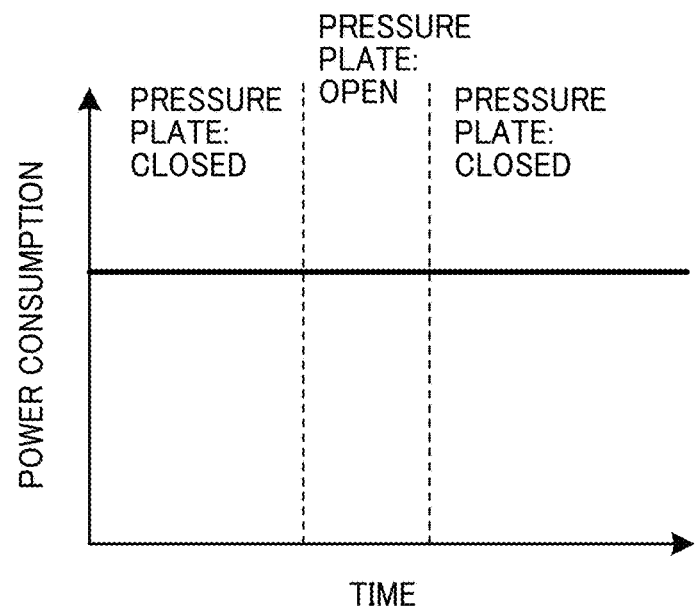
FIGS. 7A and 7B are graphs illustrating the difference in power consumption between the presence and absence of an opening and closing sensor according to the first modified example of the first embodiment.
Figure 7B:
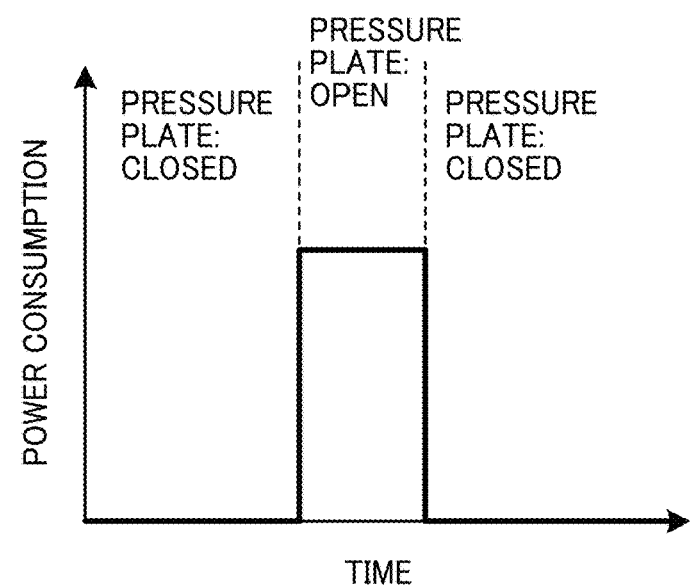

FIGS. 7A and 7B are graphs illustrating the difference in power consumption between the presence and absence of the opening and closing sensor 16. FIG. 7A illustrates the change in power consumption when the pressure plate 12 is opened and closed without the opening and closing sensor 16, as in the above-described example of FIG. 1. FIG. 7B illustrates the change in power consumption when the pressure plate 12 is opened and closed with the opening and closing sensor 16, as in the above-described example of FIG. 5.

As illustrated in FIG. 7A, without the opening and closing sensor 16, there are no triggers for starting and ending the document placement detecting operation based on the opening and closing of the pressure plate 12. In this case, the document placement detecting device 1 executes the document placement detecting operation in the closed state of the pressure plate 12, constantly consuming power regardless of the open or closed state of the pressure plate 12.

According to the structure of the document placement detecting device 1, however, the placement of the document 10 on the document table 11 normally does not take place in the closed state of the pressure plate 12. That is, the document placement detecting operation in the closed state of the pressure plate 12 is unnecessary. In the document placement detecting device 1 with the opening and closing sensor 16, therefore, the document placement detecting operation is turned off in the closed state of the pressure plate 12 and executed in the open state of the pressure plate 12, as illustrated in FIG. 7B. With the document placement detecting operation thus turned off in the closed state of the pressure plate 12, the power consumption by the document placement detecting operation is reduced.

The first embodiment may also be modified as in a second modified example in which the document placement detecting device 1 executes document size detection with a document size detector that detects the size of the document 10 placed on the document table 11.

Figure 8:
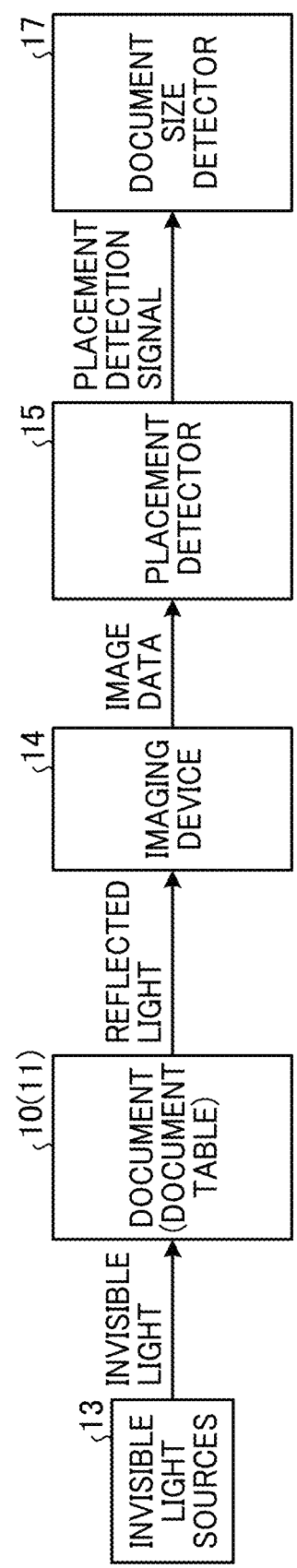
FIG. 8 is a diagram illustrating an exemplary detecting operation of a document placement detecting device according to a second modified example of the first embodiment.

FIG. 8 is a diagram illustrating an exemplary detecting operation of the document placement detecting device 1 according to the second modified example of the first embodiment. As illustrated in FIG. 8, the document placement detecting device 1 further includes a document size detector 17. Based on the read value of the image data, the placement detector 15 determines whether the document 10 is placed on the document table 11. Then, based on the detection of the placement of the document 10, the placement detector 15 transmits a placement detection signal to the document size detector 17, as illustrated in FIG. 8. In response to receipt of the placement detection signal, the document size detector 17 detects the size of the document 10. The document size detector 17 is implemented by circuitry, such as a CPU, which is the control circuit of the document placement detecting device 1 (e.g., the control circuit 200 in FIG. 26 and the image sensor 140 in FIG. 26 controlled by the control circuit 200).

Figure 9:
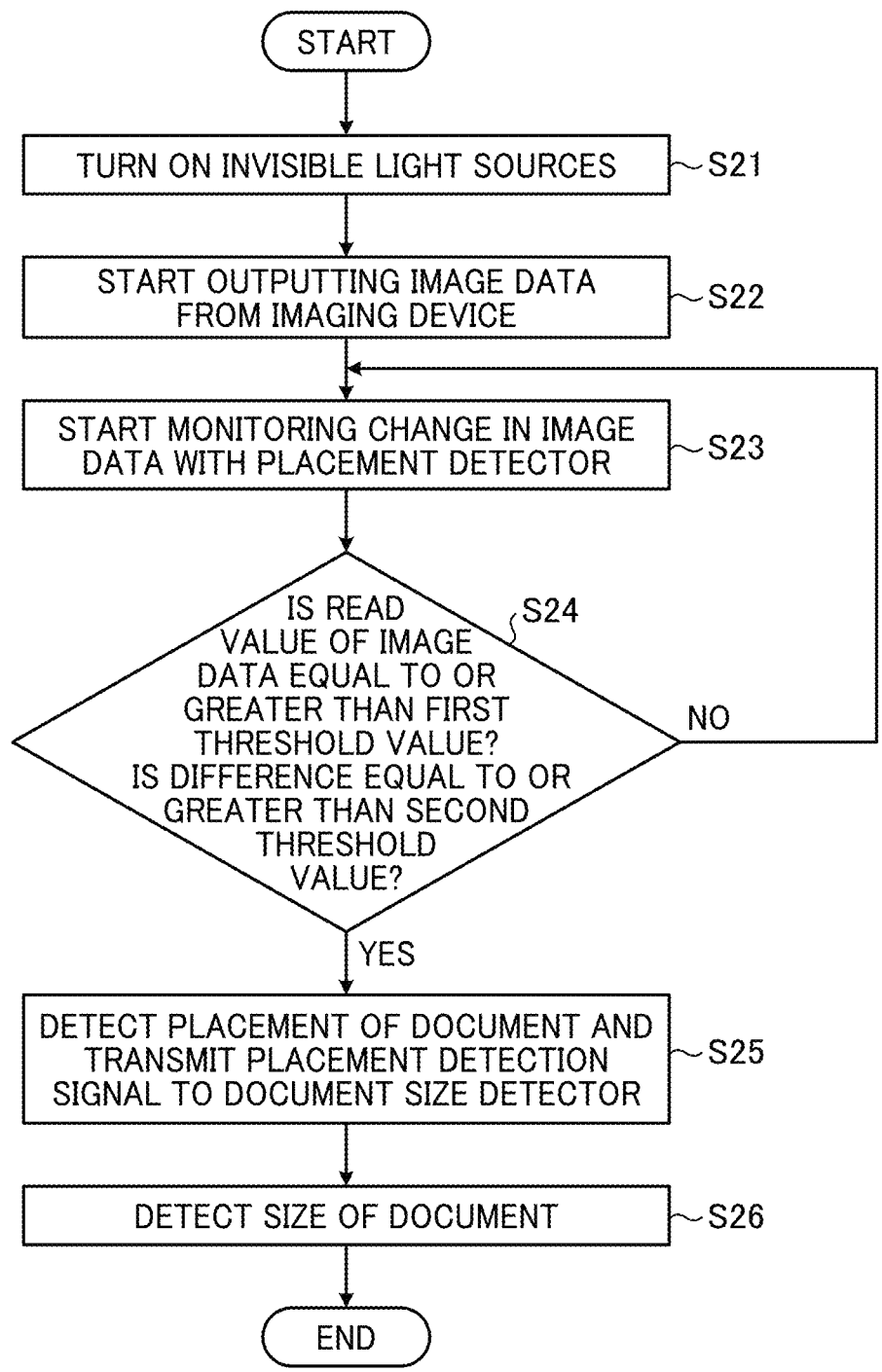
FIG. 9 is a flowchart illustrating an exemplary operation of the document placement detecting device according to the second modified example of the first embodiment.

FIG. 9 is a flowchart illustrating an exemplary operation of the document placement detecting device 1 according to the second modified example of the first embodiment. The processes of steps S21, S22, S23, and S24 correspond to those of steps S1 to S4 in FIG. 3, and thus description thereof will be omitted.

The document placement detecting device 1 detects the placement of the document and transmits the placement detection signal to the document size detector 17 (step S25). In response to receipt of the placement detection signal, the document size detector 17 detects the size of the document 10 (step S26).

Figure 10:
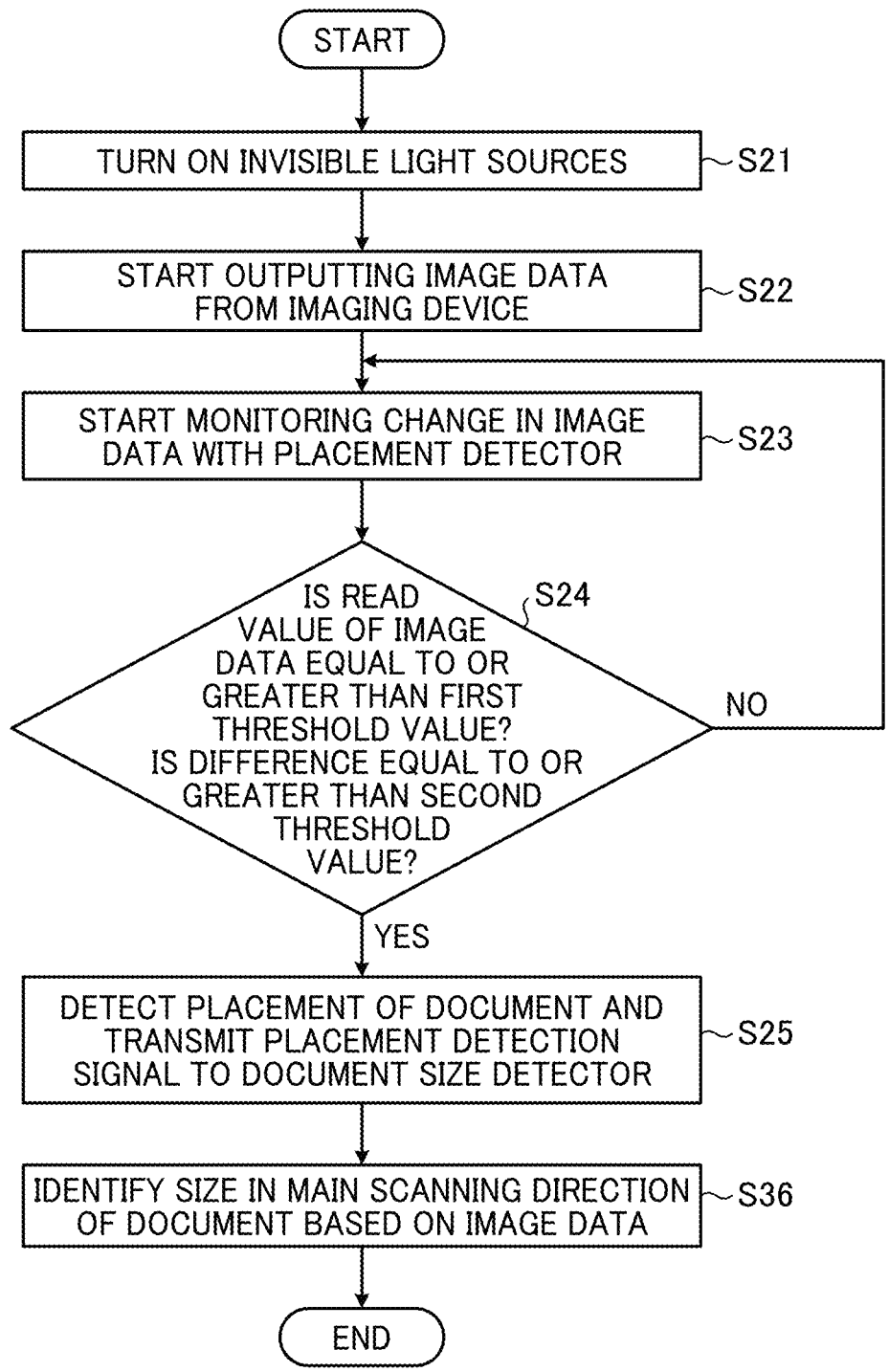
FIG. 10 is a flowchart illustrating an exemplary operation of the document placement detecting device according to the second modified example of the first embodiment.

The size detection at step S26 may be the identification of the size in the main scanning direction A (see FIG. 4) of the document 10 based on the image data, for example. FIG. 10 is a flowchart illustrating an exemplary operation of the document placement detecting device 1. As illustrated in FIG. 10, in response to receipt of the placement detection signal, the document placement detecting device 1 identifies the size in the main scanning direction A of the document 10 based on the image data (step S36).

In this case, the placement detector 15 of the document placement detecting device 1 performs the document placement detection based on the image data output from the imaging device 14. Specifically, the placement detector 15 performs the document placement detection at a standby position at which the standard sizes in the main scanning direction A of the document 10 are definable. Then, after the completion of the document placement detection, the document size detector 17 detects the size of the document 10 based on the above-described image data. Consequently, the size in the main scanning direction A of the document 10 is detected with no need to acquire dedicated image data for the document size detection.

The standby position of the placement detector 15 may be set to an upstream position in the sub-scanning direction B (see FIG. 4) at which the standard sizes in the main scanning direction A of the document 10 are definable.

The above-described configuration reduces the time of the document size detection. Further, since the image data is acquired with the invisible light sources 13, the size detecting operation does not cause the user to feel glare.

The pressure plate 12 includes a background member positioned on the rear side of the document 10. The background member is not limited to a particular material. However, if the color of the document 10 is white, for example, it is desirable that the background member has a characteristic of reflecting visible light and absorbing invisible light, as in a third modified example of the first embodiment described below.

Figure 11:
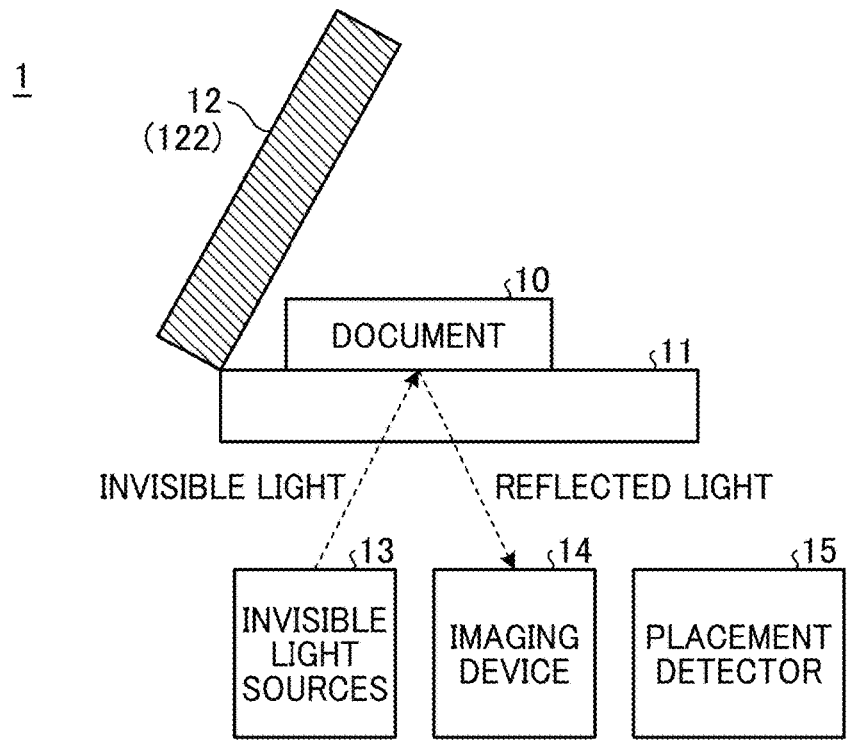
FIG. 11 is a diagram illustrating a configuration of a background member of a pressure plate included in a document placement detecting device according to a third modified example of the first embodiment.
Figure 12A:
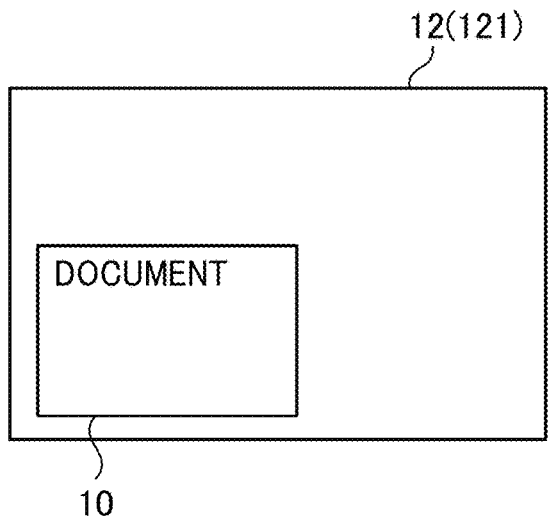
FIGS. 12A and 12B are diagrams illustrating the background member of the pressure plate according to the third modified example of the first embodiment.
Figure 12B:
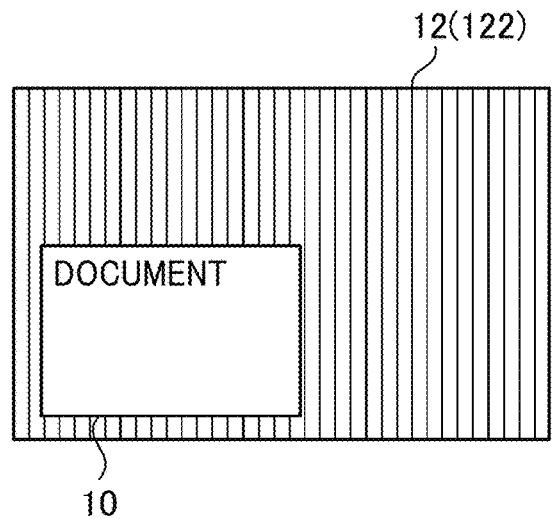

FIG. 11 and FIGS. 12A and 12B are diagrams illustrating the background member of the pressure plate 12 according to the third modified example of the first embodiment. As illustrated in FIG. 11, the pressure plate 12 includes a background member 122 with the characteristic of reflecting visible light and absorbing invisible light.

With reference to FIGS. 12A and 12B, a description will be given of a difference between the pressure plate 12 with a white background member and the pressure plate 12 with the background member 122.

FIG. 12A illustrates the pressure plate 12 with a white background member 121. In the closed state of the pressure plate 12, the rear side of the document 10 is covered by the white background member 121. If the color of the document 10 is white, the invisible light emitted from the invisible light sources 13 is reflected by both the document 10 and the white background member 121 of the pressure plate 12. In the closed state of the pressure plate 12, therefore, it is difficult to distinguish the document 10 from the pressure plate 12 in the read image.

FIG. 12B illustrates the pressure plate 12 with the background member 122 having the characteristic of reflecting visible light and absorbing invisible light. When irradiated with visible light, the background member 122 reflects the visible light, similarly to the above-described white background member 121 of the pressure plate 12. In a regular reading operation with visible light, therefore, the background member 122 does not affect the read image. The invisible light emitted from the invisible light sources 13, on the other hand, is reflected by the document 10 but is absorbed by the background member 122 surrounding the document 10. In the closed state of the pressure plate 12, therefore, the document 10 is distinguishable from the pressure plate 12 in the read image, enabling the document placement detection and the document size detection.

A second embodiment of the present invention will be described.

The document placement detecting device 1 may be applied to an image reading device.

Figure 13:
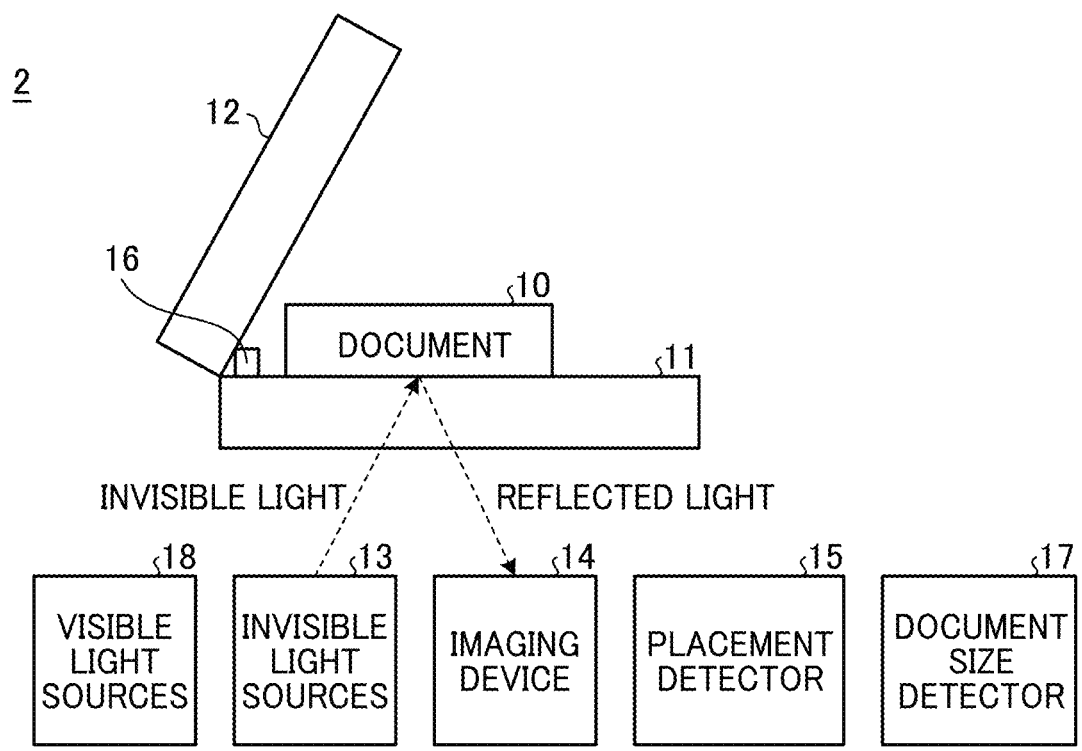
FIG. 13 is a diagram illustrating a configuration of an image reading device according to a second embodiment of the present invention.
Figure 14:
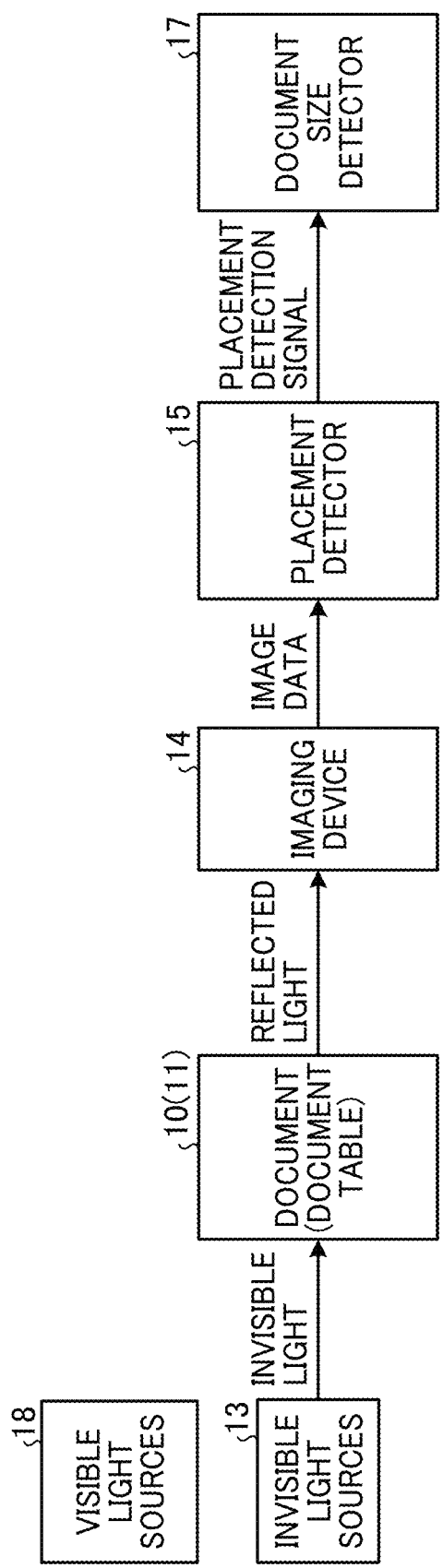
FIG. 14 is a diagram illustrating an operation of the image reading device of the second embodiment.

FIGS. 13 and 14 are diagrams illustrating an image reading device of the second embodiment. An image reading device 2 illustrated in FIG. 13 includes the document size detector 17 and visible light sources 18 in addition to the configuration of the document placement detecting device 1 illustrated in FIG. 5.

The invisible light sources 13 emit the invisible light for the document placement detection and the document size detection. After the document placement detection and the document size detection, the visible light sources 18 irradiate the document 10 with visible light in the regular reading operation of reading the image of the document 10.

With the above-described configuration, the image reading device 2 promptly starts the copying or scanning operation.

A description will be given of an example of the invisible light sources 13 of the image reading device 2.

There are multiple possible combinations of types of the imaging device 14 and types of the invisible light sources 13. The following description will be given of an example of the invisible light sources 13 usable in combination with a typical semiconductor device employed as the imaging device 14. For example, it is assumed here that a charge coupled device (CCD) with silicon is used as the imaging device 14. In this case, near-infrared (NIR) light sources are usable as the invisible light sources 13, as described below.

Figure 15:
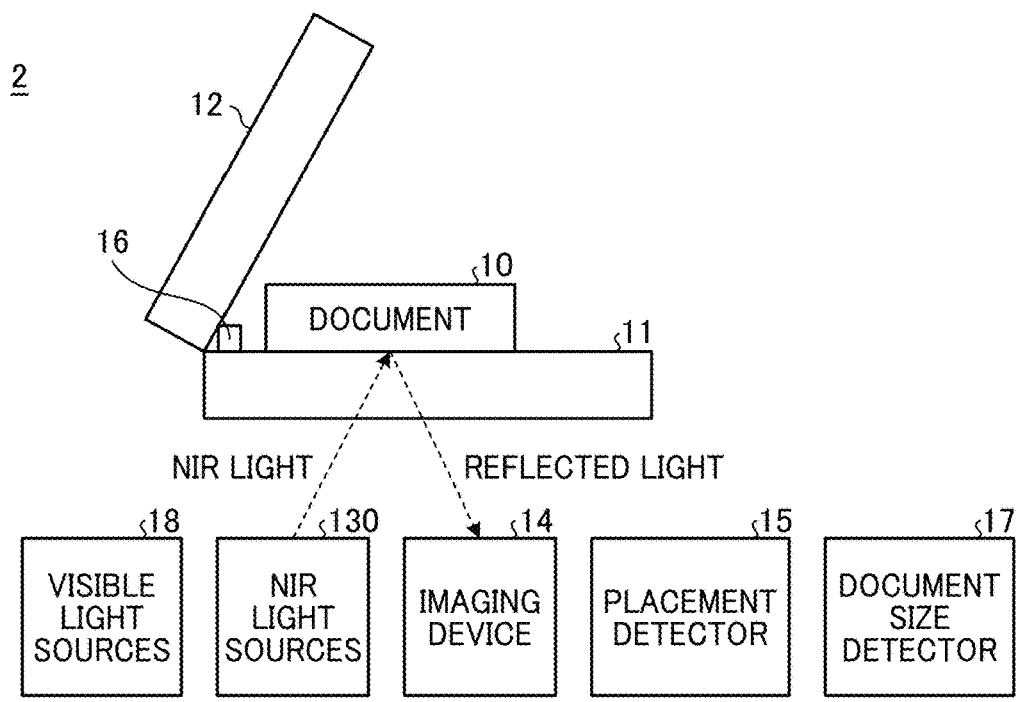
FIG. 15 is a diagram illustrating the image reading device of the second embodiment using near-infrared (NIR) light sources as invisible light sources.
Figure 16:
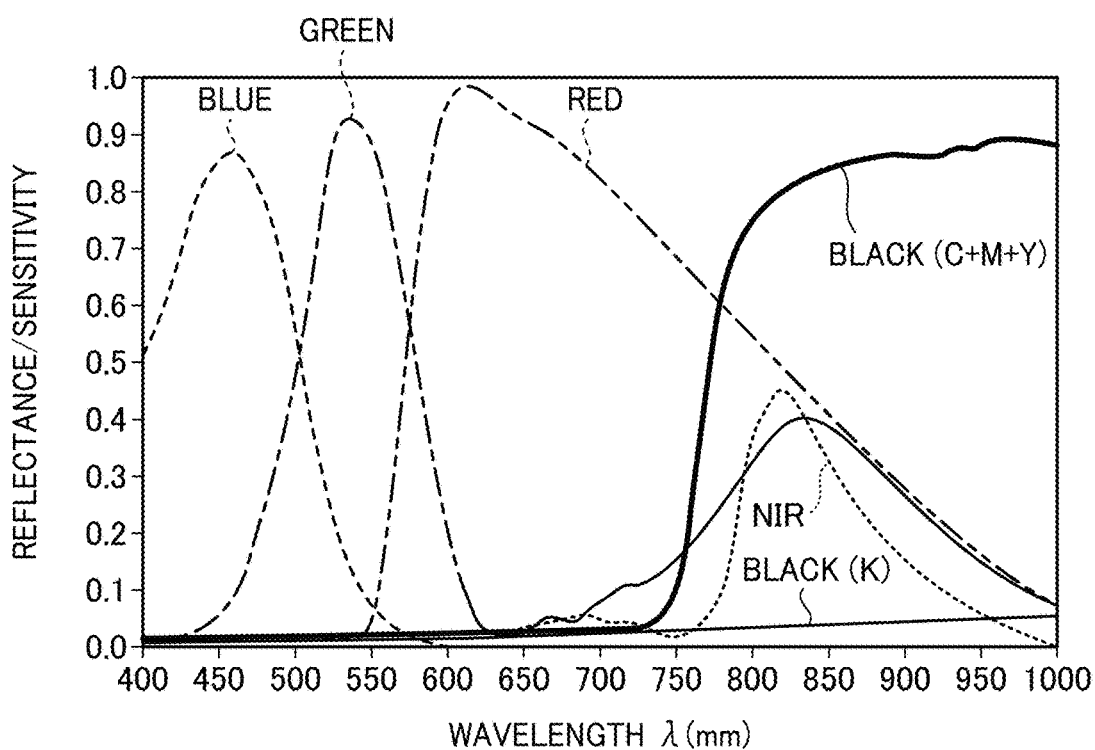
FIG. 16 is a graph illustrating an example of the light reception sensitivity characteristic of a charge coupled device (CCD) with silicon applicable to the image reading device of the second embodiment.

FIGS. 15 and 16 are a diagram and a graph, respectively, illustrating the image reading device 2 using NIR light sources as the invisible light sources 13. The imaging device 14 of the image reading device 2 is a CCD with silicon, and the invisible light sources 13 are NIR light sources 130, as illustrated in FIG. 15.

FIG. 16 is a graph illustrating an example of the light reception sensitivity characteristic of a CCD with silicon. In FIG. 16, C, M, Y, K, and NIR represent cyan, magenta, yellow, black, and near-infrared, respectively. Since silicon is sensitive to light in the NIR wavelength range, as illustrated in FIG. 16, the NIR light sources 130 are usable as the invisible light sources 13.

Although the CCD is used as an example of the imaging device 14 in the present example, the imaging device 14 is not limited to the CCD. For example, a semiconductor device such as a complementary metal-oxide semiconductor (CMOS) may be used as the imaging device 14.

Since the invisible light sources 13 are thus usable with a typical semiconductor device, the configuration of the imaging device 14 is simplified.

Figure 17:
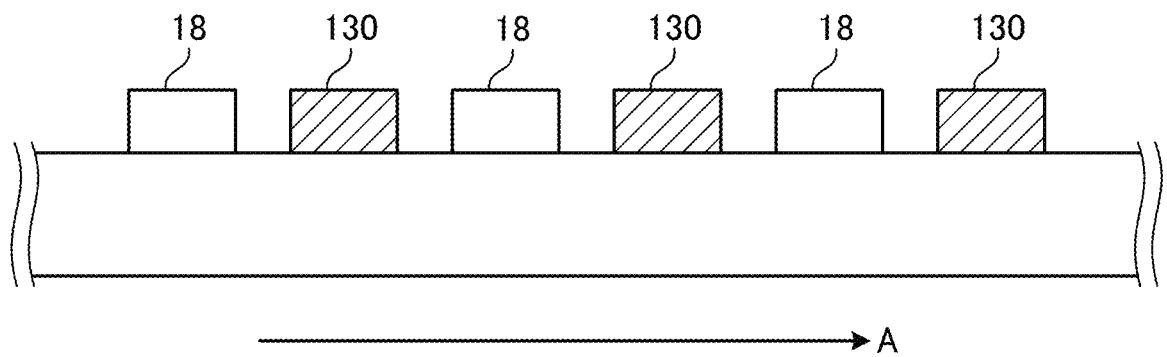
FIG. 17 is a diagram illustrating an exemplary configuration of visible light sources and the NIR light sources included in the image reading device of the second embodiment.

FIG. 17 is a diagram illustrating an exemplary configuration of the visible light sources 18 and the NIR light sources 130. As illustrated in FIG. 17, the visible light sources 18 and the NIR light sources 130 are alternately arranged. In the example of FIG. 17, the visible light sources 18 are linearly arranged with an NIR light source 130 disposed between each two successive visible light sources 18. Thereby, the visible light sources 18 and the NIR light sources 130 are linearly and alternately arranged.

As in this arrangement example of the visible light sources 18 and the NIR light sources 130, white light sources and invisible light sources may be disposed on a single board, thereby reducing the number of components and installation space.

In the image reading device 2 of the second embodiment, the visible light sources 18 and the NIR light sources 130 are alternately arranged. The image reading device 2, however, is not limited to this configuration.

Figure 18:
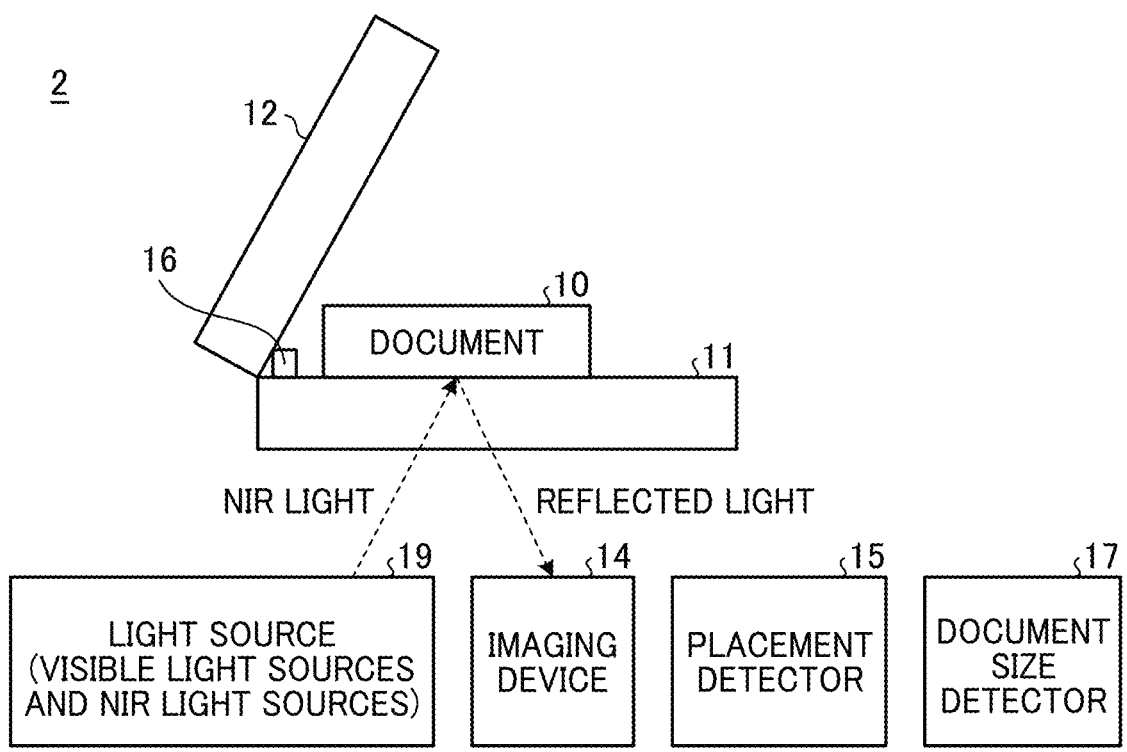
FIG. 18 is a diagram illustrating an exemplary configuration of an image reading device according to a first modified example of the second embodiment.

FIG. 18 is a diagram illustrating an exemplary configuration of the image reading device 2 according to a first modified example of the second embodiment. As illustrated in FIG. 18, the image reading device 2 includes a light source 19 integrating the visible light sources 18 and the NIR light sources 130.

Figure 19A:
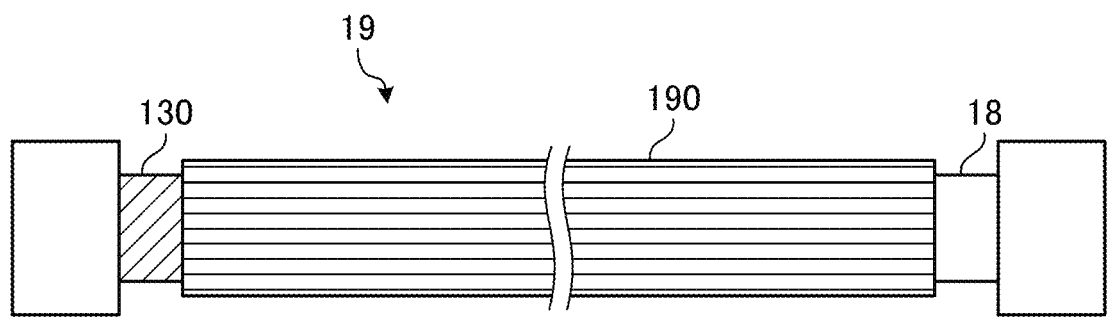
FIGS. 19A and 19B are diagrams illustrating exemplary configurations of a light source of the image reading device according to the first modified example of the second embodiment integrating the visible light sources and the NIR light sources.
Figure 19B:
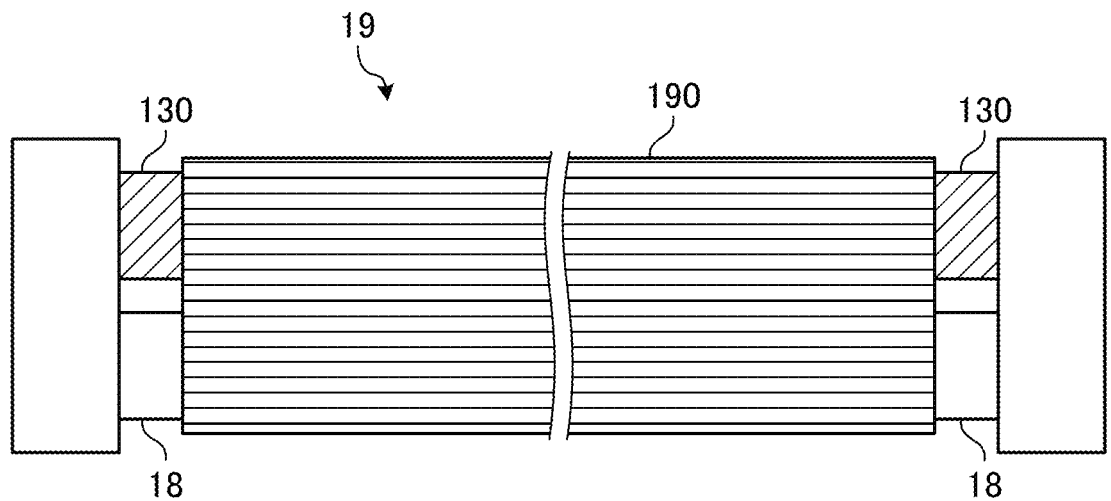

FIGS. 19A and 19B are diagrams illustrating exemplary configurations of the light source 19 integrating the visible light sources 18 and the NIR light sources 130. In each of the examples in FIGS. 19A and 19B, the light source 19 includes a light guide plate 190. According to the integral configuration of the light source 19, when the visible light sources 18 are turned on, the visible light is emitted from a surface of the light guide plate 190 toward the document 10. Further, when the NIR light sources 130 are turned on, the NIR light is emitted from the surface of the light guide plate 190 toward the document 10. Although the NIR light is used in the example described here, invisible light shorter in wavelength than the NIR light may be used.

With the visible light sources 18 and the NIR light sources 130 thus integrated, the installation space and the assembly man-hours are reduced.

The procedure of the operation of the image reading device 2 may be modified such that when the change in the image data falls below the threshold value after the start of the monitoring of the change in the image data, the image reading device 2 stops the document placement detecting operation.

Figure 20:
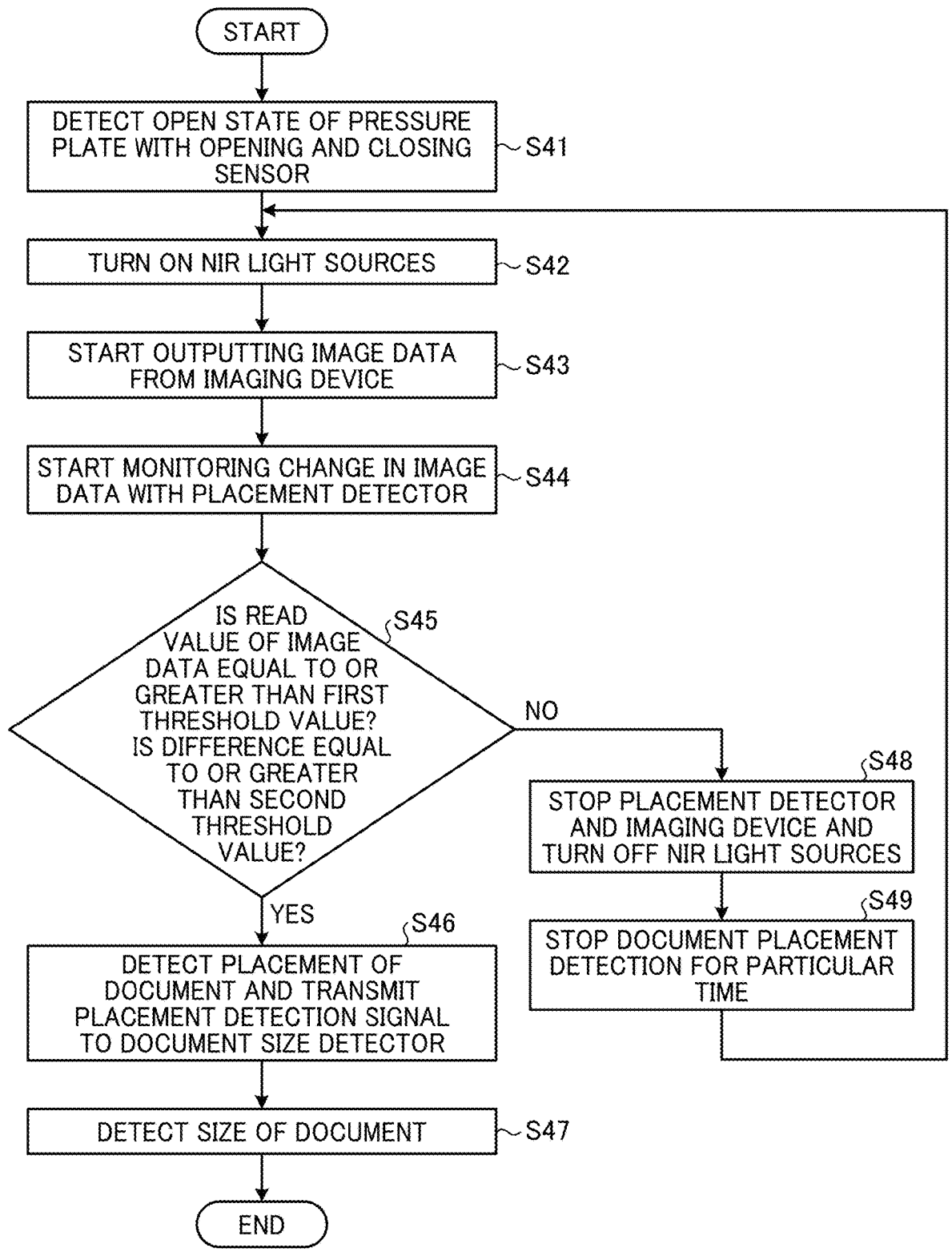
FIG. 20 is a flowchart illustrating an operation of the image reading device of the second embodiment including a step of stopping the operation for a particular time period.

FIG. 20 is a flowchart illustrating an exemplary operation of the image reading device 2. Step S41 corresponds to step S11 in FIG. 6, and steps S42 to S47 correspond to steps S21 to S26 in FIG. 9. Thus, description of these steps will be omitted. Although the invisible light sources 13 are the NIR light sources 130 in the example described here, the operation procedure of FIG. 20 is similar to those of FIGS. 6 and 9 not using the NIR light sources 130.

In FIG. 20, the image reading device 2 stops the placement detector 15 and the imaging device 14 and turns off the NIR light sources 130 as the invisible light sources 13 (step S48). Then, the image reading device 2 stops the document placement detecting operation for a particular time period (step S49), and returns to step S42 to turn on the NIR light sources 130 and start the placement detector 15 and the imaging device 14 to resume the document placement detecting operation.

The time for which the document placement detecting operation is stopped at step S49 may be set to a desired time period. For example, the image reading device 2 may be equipped with a motion sensor, and the time for which the document placement detecting operation is stopped may be set to the period of no detection by the motion sensor.

With the above-described configuration, the power consumption is reduced during the document placement detecting operation.

After the document size is detected, the user presses a read start button to specify the document reading operation, and thereby the image reading device 2 starts the document reading operation. Alternatively, the image reading device 2 may automatically start the document reading operation.

Figure 21:
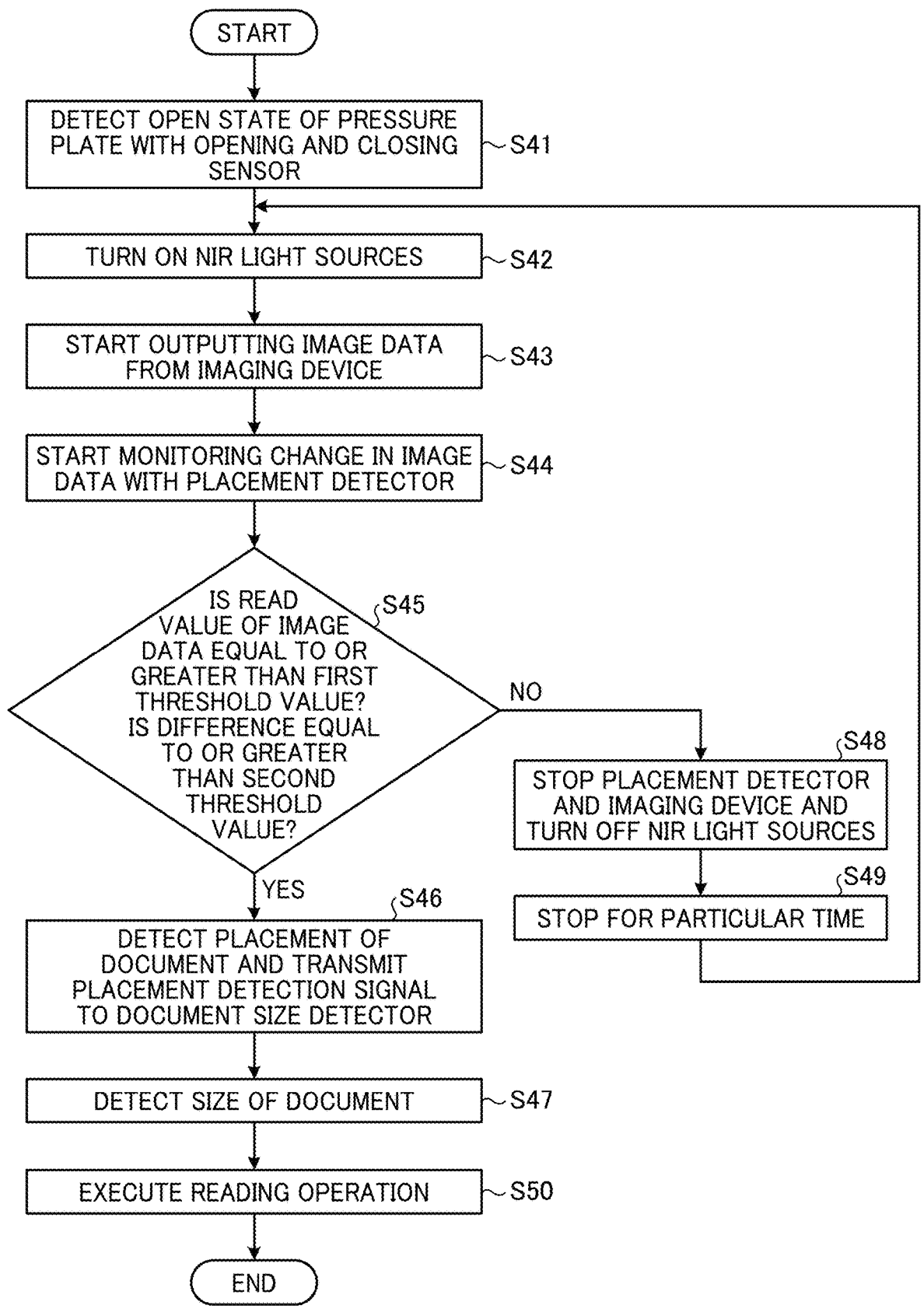
FIG. 21 is a flowchart illustrating an example of an automatic reading start operation of the image reading device of the second embodiment.

FIG. 21 is a flowchart illustrating an example of an automatic reading start operation of the image reading device 2. As illustrated in FIG. 21, after the completion of the processes of steps S41 to S49, the image reading device 2 executes the document reading operation at step S50.

With the image reading device 2 thus automatically executing the regular document reading operation after the document size detection of the document size detector 17, the need for the user to press the read start button is obviated, reducing the copying or scanning time.

As a modified example of the document placement detecting operation, the image data may be stored in the beginning of the document placement detecting operation. Then, when determining whether the document 10 is placed on the document table 11, the stored image data may be subtracted from the image data acquired during the document placement detecting operation, to thereby detect the placement of the document 10.

Figure 22:
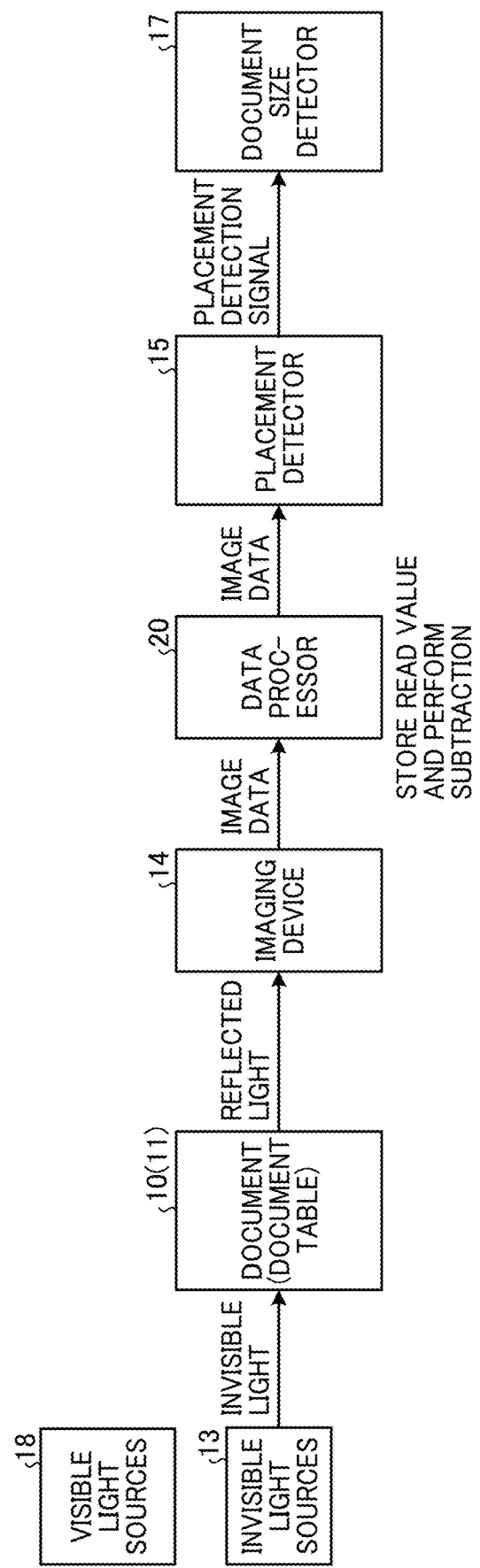
FIG. 22 is a diagram illustrating an exemplary configuration of the image reading device of the second embodiment including a data processor.

As illustrated in FIG. 22, the image reading device 2 includes a data processor 20. The data processor 20 stores the image data output from the imaging device 14 in the beginning of the document placement detecting operation. Then, when determining whether the document 10 is placed on the document table 11, the data processor 20 subtracts the stored image data from the image data acquired during the document placement detecting operation, and outputs the resultant difference to the placement detector 15. The data processor 20 is implemented by circuitry, such as a CPU, which is a control circuit of the image reading device 2 (e.g., the control circuit 200 in FIG. 26 and an image processing circuit 204 in FIG. 26 controlled by the control circuit 200).

Figure 23:
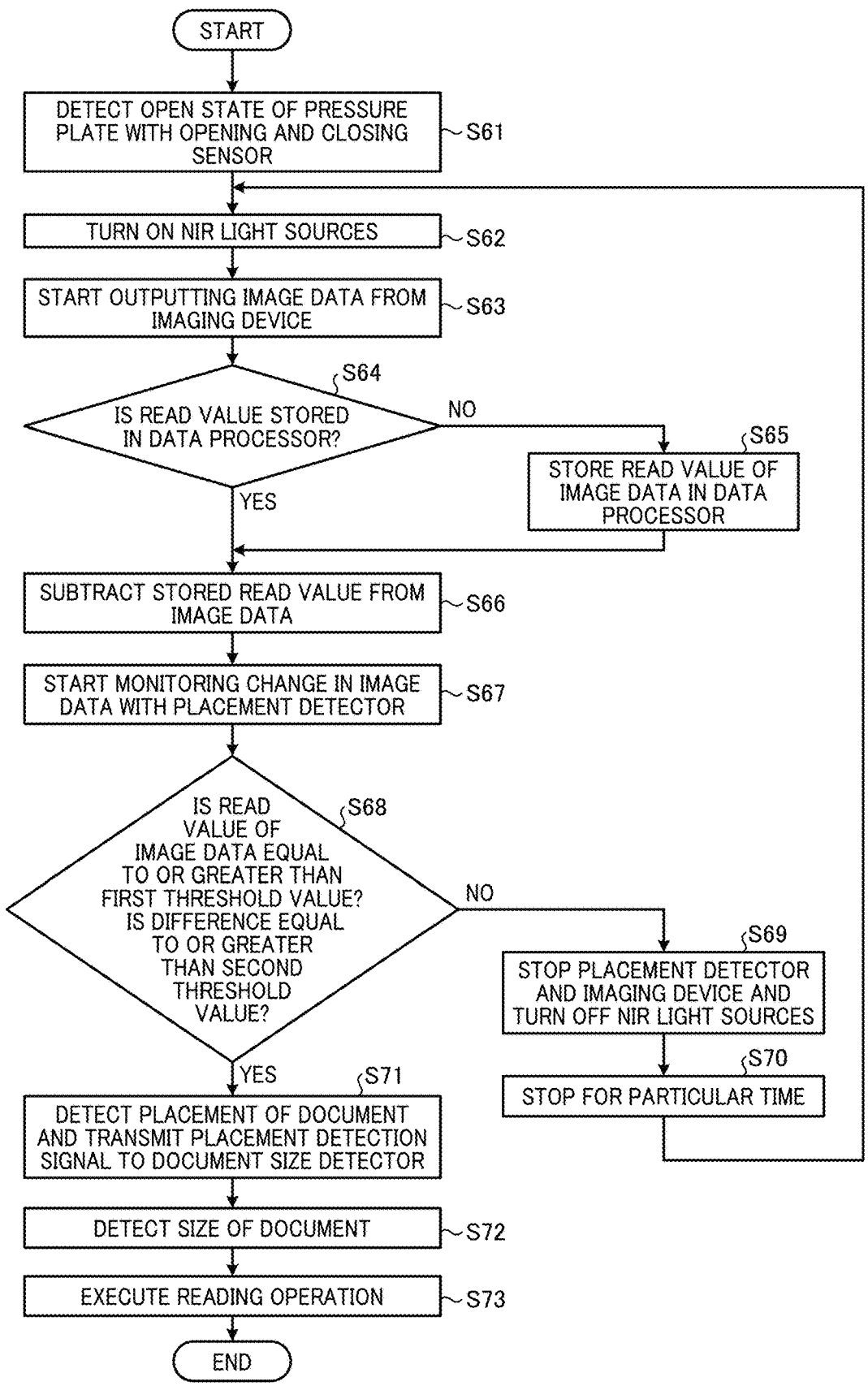
FIG. 23 is a flowchart illustrating an exemplary operation of the image reading device of the second embodiment using stored image data.

FIG. 23 is a flowchart illustrating an exemplary operation of the image reading device 2. The image reading device 2 first detects the open state of the pressure plate 12 with the opening and closing sensor 16 (step S61). The image reading device 2 then turns on the NIR light sources 130 (step S62), and starts outputting the image data from the imaging device 14 (step S63).

Then, the image reading device 2 determines whether the read value is stored in the data processor 20 (step S64). If it is determined that the read value is not stored in the data processor 20 (NO at step S64), the image reading device 2 stores the read value of the image data in the data processor 20 (step S65), and proceeds to step S66.

If it is determined that the read value is stored in the data processor 20 (YES at step S64), the image reading device 2 proceeds to step S66.

The image reading device 2 then subtracts the read value stored in the data processor 20 from the image data output from the imaging device 14 (step S66).

Then, the image reading device 2 starts monitoring the change in the image data with the placement detector 15 (step S67). The image reading device 2 then determines whether the read value of the image data is equal to or greater than the first threshold value, and whether the difference between the read value of the image data obtained during the document placement detecting operation and the read value of the image data obtained with the pressure plate 12 closed without the document 10 on the document table 11 is equal to or greater than the second threshold value (step S68).

If it is determined that the two conditions of step S68 are not met (NO at step S68), the image reading device 2 stops the placement detector 15 and the imaging device 14 and turns off the NIR light sources 130 (step S69). The image reading device 2 then stops the document placement detecting operation for a particular time period (step S70), and returns to step S62 to turn on the NIR light sources 130 and start the placement detector 15 and the imaging device 14 to resume the document placement detecting operation.

If it is determined that the two conditions of step S68 are met (YES at step S68), the image reading device 2 detects the placement of the document 10 and transmits the placement detection signal to the document size detector 17 (step S71). In response to receipt of the placement detection signal, the document size detector 17 detects the size of the document 10 (step S72). After the completion of the document size detection, the image reading device 2 automatically executes the document reading operation (step S73).

According to the present configuration, even in an environment with ambient light similar in intensity to the light reflected by the document 10 placed on the document table 11, the document placement detection is not affected by the ambient light, thereby improving the document placement detection performance.

A description will be given of an application example of the image reading device 2 to an image forming apparatus.

Figure 24:
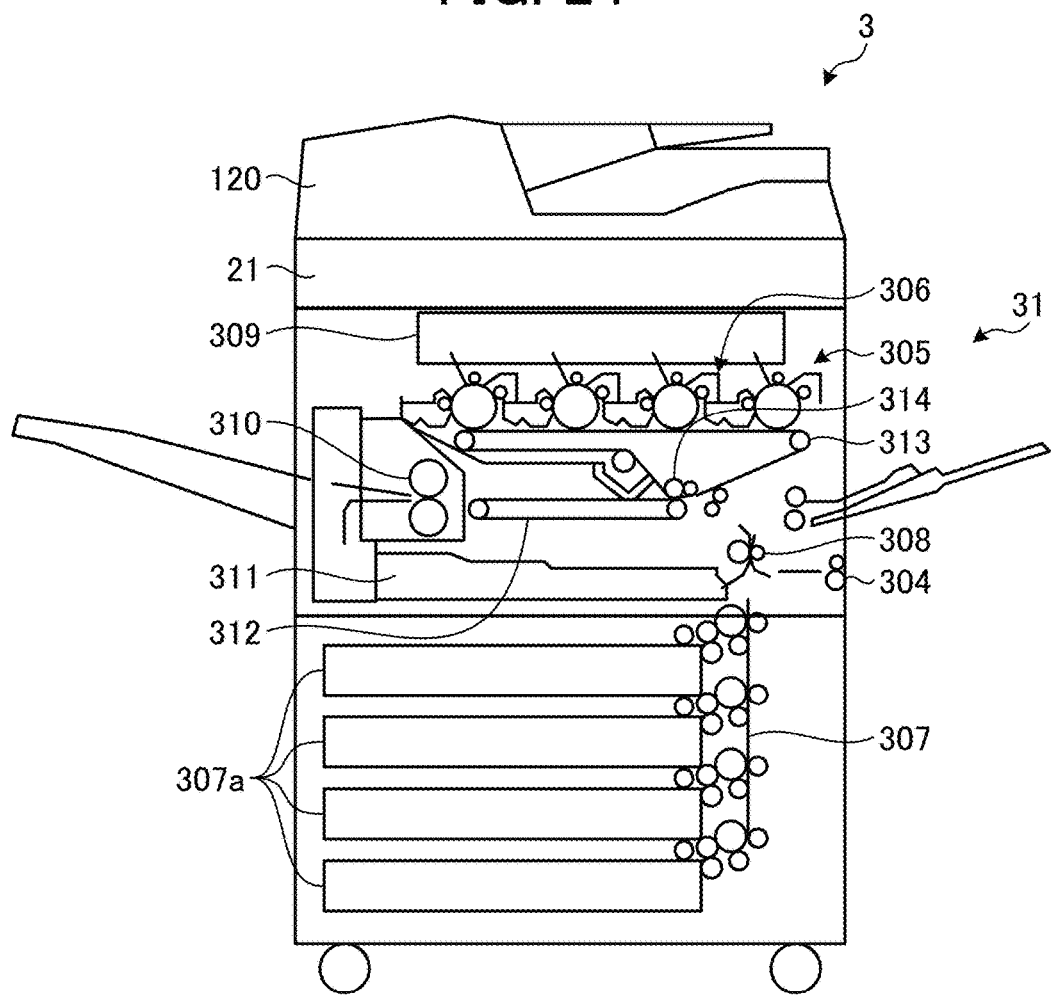
FIG. 24 is a diagram illustrating an exemplary configuration of an image forming apparatus with the image reading device of the second embodiment applied thereto.

FIG. 24 is a diagram illustrating an exemplary configuration of an image forming apparatus 3 to which the image reading device 2 is applied. The image forming apparatus 3 in FIG. 24 is typically called a multifunction peripheral/product/printer (MFP) with at least two functions out of a copier function, a printer function, a scanner function, and a facsimile (FAX) function.

The image forming apparatus 3 includes an image reading device 21 and an image forming device 31 disposed below the image reading device 21. The image reading device 21 corresponds to the above-described image reading device 2. The image reading device 21 and the image forming device 31 are controlled by a control board included in the image forming apparatus 3. FIG. 24 illustrates an internal structure of the image forming device 31 with an outer cover thereof removed for illustrative purposes.

A pressure plate 120 in FIG. 24 corresponds to the above-described pressure plate 12. The pressure plate 120 is fixed to a contact glass 110 (see FIG. 25) to be openable and closable relative to the contact glass 110. The contact glass 110 corresponds to the above-described document table 11. For example, when the user lifts one side of the pressure plate 120, the pressure plate 120 is opened into the open state, exposing an upper surface of the contact glass 110. Further, when the user places the document 10 on the upper surface of the contact glass 110 and lowers the lifted side of the pressure plate 120 to the original position, the pressure plate 120 is closed into the closed state, pressing the document 10 against the upper surface of the contact glass 100.

An upper surface of the image reading device 21 includes the contact glass 110, on which the document 10 is placed, as described in more detail later with reference to FIG. 25. The image reading device 21 reads the document 10 on the contact glass 110. The image reading device 21 includes therein the imaging device 14, the invisible light sources 13, and the visible light sources 18. That is, the image reading device 21 is a scanner including therein a light source of invisible light and visible light, an optical system, and a semiconductor device such as an imaging sensor (e.g., a CCD). The image reading device 21 emits the visible light or invisible light from the light source, and reads the reflected light from the document 10 with the image sensor.

The image forming device 31 includes manual feeding rollers 304, a tandem image forming unit 305, a recording sheet supply unit 307, registration rollers 308, an optical writing device 309, a fixing device 310, a reversing mechanism 311, a second transfer belt 312, an intermediate transfer belt 313, and a transfer device 314.

The manual feeding rollers 304 transport a manually fed recording sheet. The recording sheet supply unit 307, which supplies a recording sheet, includes a mechanism that feeds the recording sheet from one of multiple recording sheet feeding cassettes 307a. The supplied recording sheet is transported to the second transfer belt 312 via the registration rollers 308.

In the transfer device 314, toner images formed on the intermediate transfer belt 313 are transferred onto the recording sheet transported on the second transfer belt 312.

Through an image forming process of the image forming unit 305, images written by the optical writing device 309 are transferred (i.e., first-transferred) onto the intermediate transfer belt 313 as toner images. The image forming unit 305, which forms yellow (Y), magenta (M), cyan (C), and black (K) images, includes four photoconductor drums corresponding to the Y, M, C, and K images. The photoconductor drums are rotatably disposed in the image forming unit 305. Each of the photoconductor drums is surrounded by image forming components 306 including a charging roller, a development device, a first transfer roller, a cleaning device, and a discharger. With the image forming components 306 functioning around the photoconductor drums, the toner images formed on the photoconductor drums are first-transferred onto the intermediate transfer belt 313 by the respective first transfer rollers.

The intermediate transfer belt 313 is stretched by a drive roller and a driven roller and disposed in nips between the photoconductor drums and the first transfer rollers. With the rotation of the intermediate transfer belt 313, the toner images first-transferred to the intermediate transfer belt 313 are second-transferred onto the recording sheet on the second transfer belt 312 in the transfer device 314. With the rotation of the second transfer belt 312, the recording sheet is transported to the fixing device 310, in which the toner images are fixed on the recording sheet as a color image. The recording sheet is then ejected onto a sheet ejection tray outside the image forming apparatus 3. In two-sided printing, the recording sheet is reversed by the reversing mechanism 311 and sent back onto the second transfer belt 312.

The image forming device 31 is not limited to the above-described image formation with the electrophotographic method, and may form an image with the inkjet method.

Figure 25:
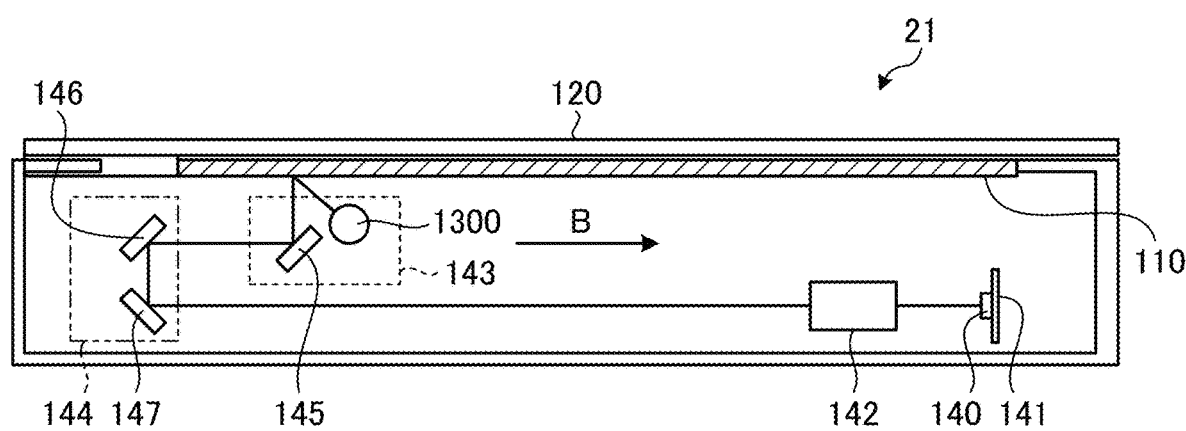
FIG. 25 is a diagram illustrating a configuration of the image reading device in the image forming apparatus.

FIG. 25 is a diagram illustrating a configuration of the image reading device 21. As illustrated in FIG. 25, the image reading device 21 includes therein a sensor board 141 including the image sensor 140, a lens unit 142, a first carriage 143, and a second carriage 144. The first carriage 143 includes a light source 1300 and a mirror 145. The second carriage 144 includes mirrors 146 and 147. The image reading device 21 includes the contact glass 110 on the upper surface thereof.

The light source 1300 includes visible light sources and invisible light sources. The visible light sources and the invisible light sources are separated from each other or integrated together. The invisible light from the invisible light sources has a wavelength of 380 nanometers (nm) or less or a wavelength of 750 nm or greater, for example. The light source 1300 selectively emits the visible light and the invisible light (e.g., NIR light) toward the contact glass 110.

In the reading operation, the image reading device 21 moves the first carriage 143 and the second carriage 144 in the sub-scanning direction B from standby positions (i.e., home positions) thereof. The reflected light from the document 10 placed on the contact glass 110 and the pressure plate 120 forms an image on the image sensor 140 via the lens unit 142.

The image sensor 140 is capable of imaging in the wavelength ranges of visible light and invisible light. The image sensor 140 includes an arrangement of pixels for converting incident light into electrical signals. The pixels are arranged in a matrix, for example. The electrical signals obtained from the pixels are transmitted to a subsequent signal processing circuit in a particular order at particular time intervals.

Figure 26:
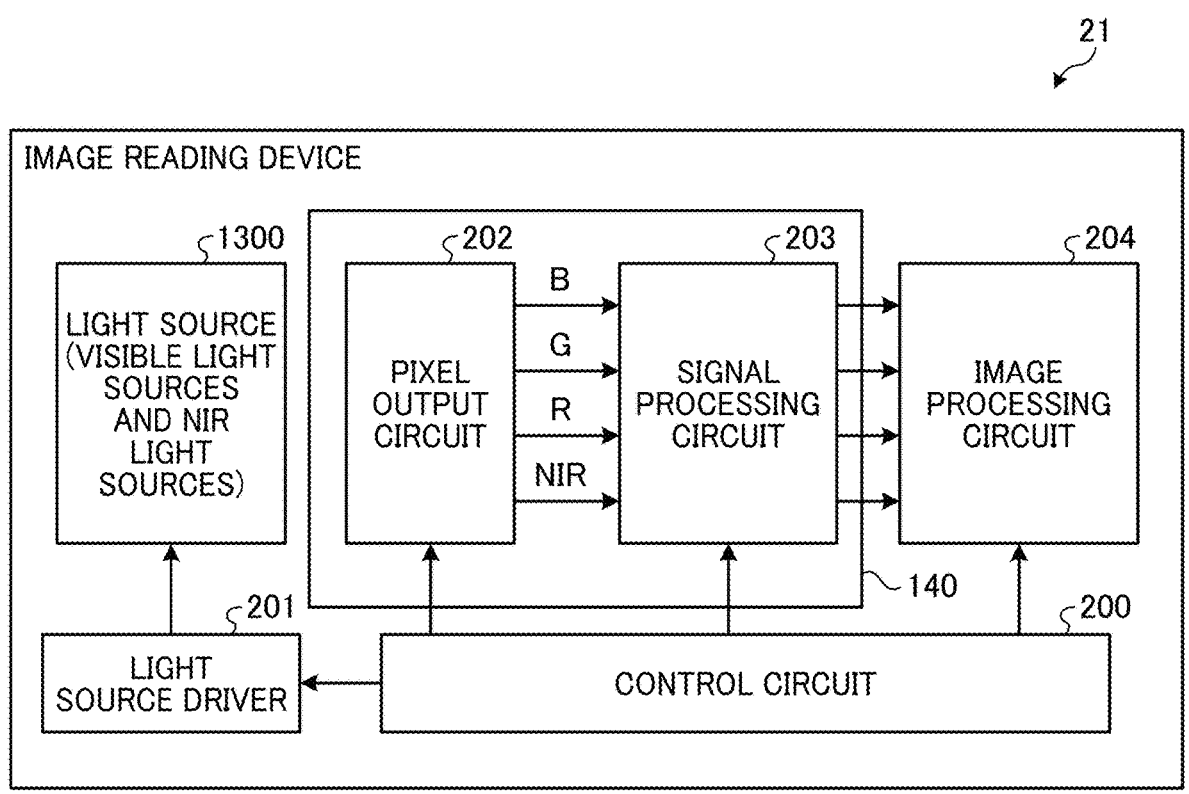
FIG. 26 is a diagram illustrating an example of a control block that controls the imaging device in the image forming apparatus.

FIG. 26 is a diagram illustrating an example of a control block that controls the image reading device 21. FIG. 26 illustrates a configuration of a control block that controls image reading.

The control circuit 200 controls the image sensor 140, the image processing circuit 204, and a light source driver 201. Based on an instruction from the control circuit 200, the light source driver 201 selectively drives the invisible light sources and the visible light sources of the light source 1300.

When the visible light is emitted from the light source 1300, a pixel output circuit 202 of the image sensor 140 outputs image data with red (R), green (G), and blue (B) read values. When the invisible light (e.g., NIR light) is emitted from the light source 1300, the pixel output circuit 202 outputs image data with an NIR read value.

A signal processing circuit 203 of the image sensor 140 performs signal processing on the image data output from the pixel output circuit 202, and transmits the processed image data to the image processing circuit 204. The image processing circuit 204 performs various image processing on the image data in accordance with the purpose of use of the image data. The image data with the NIR read value is used in the document placement detection of the placement detector 15.

The processes executed in the foregoing embodiments and modified examples may be provided through application specific integrated circuits (ASICs) or programs executed by a computer. In the latter case, the programs may be previously stored in a read only memory (ROM) or a hard disk drive (HDD), for example, to provide the processes as functional units. In this case, a CPU reads the programs and executes the programs step by step to implement various functional units. The programs may also be recorded on a computer readable recording medium to be provided as a computer program product. For example, the programs may be provided as recorded on a recording medium, such as a flexible disk, a compact disc-recordable (CD-R), a digital versatile disk (DVD), a Blu-ray Disc™, or a semiconductor memory, in an installable or executable file format.

Further, the programs may be stored in a computer connected to a network such as the Internet, and may be provided as downloaded via the network. The programs executed in the embodiments and modified examples may also be provided or distributed via a network such as the Internet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A document placement detecting device comprising:
a document table that transmits light;
a plate openable and closable relative to the document table, and configured to cover the document table in a closed state of the plate;
a plurality of invisible light sources configured to irradiate a placement area with invisible light via the document table, the placement area being an area of the document table on which a document is placed;
an imaging device configured to receive reflected light from the document and output read data; and
circuitry configured to detect the placement of the document with a change in a read value of the read data output from the imaging device based on the irradiation with the invisible light.

2. The document placement detecting device of claim 1, further comprising an opening and closing sensor configured to detect an open state and the closed state of the plate,
wherein when the opening and closing sensor detects the open state of the plate, the circuitry executes document placement detection with the read data output from the imaging device based on the irradiation with the invisible light.

3. The document placement detecting device of claim 1, wherein in response to the detection of the placement of the document, the circuitry starts detecting a size of the document.

4. The document placement detecting device of claim 3, wherein the circuitry detects a size in a main scanning direction of the document based on the read data.

5. The document placement detecting device of claim 1, wherein the plate includes a member that reflects visible light and absorbs the invisible light.

6. The document placement detecting device of claim 1, wherein when the read value of the read data is equal to or greater than a first threshold value and a difference value is equal to or greater than a second threshold value, the circuitry detects the placement of the document,
the first threshold value indicating the change in the read value of the read data, and
the difference value representing difference between a read value of the read data obtained when the document is present on the document table and a read value of the read data obtained when the plate is closed with the document absent on the document table.

7. The document placement detecting device of claim 1, wherein the plurality of invisible light sources are a plurality of near-infrared light sources.

8. An image reading device comprising:
the document placement detecting device of claim 1; and
a plurality of visible light sources configured to irradiate the document with visible light via the document table.

9. The image reading device of claim 8, wherein the plurality of visible light sources and the plurality of visible light sources are integrated.

10. The image reading device of claim 8, wherein during a document placement detecting operation of detecting whether the document is placed on the document table, in response to lack of detection of the placement of the document, the circuitry stops, for a particular time period, the document placement detecting operation, an operation of the imaging device, and the irradiation with the invisible light from the plurality of invisible light sources.

11. The image reading device of claim 8, wherein in response to the detection of the placement of the document, the circuitry starts detecting a size of the document, and
wherein after the detection of the size of the document, the circuitry executes a reading operation with the visible light.

12. The image reading device of claim 10, wherein the circuitry
stores a read value of the read data obtained in beginning of the document placement detecting operation, and
subtracts the stored read value of the read data from a read value of the read data obtained during the document placement detecting operation.

13. An image forming apparatus comprising:
the image reading device of claim 8 to read the document; and
an image forming device configured to form an image based on read data read from the document by the image reading device.

14. A method of detecting placement of a document with a document placement detecting device, the document placement detecting device including a document table and a plate, the document table transmitting light, and the plate being openable and closable relative to the document table and covering the document table in a closed state of the plate,
the method comprising:
irradiating a placement area with invisible light via the document table, the placement area being an area of the document table on which the document is placed;
receiving reflected light from the document with an imaging device;
outputting read data from the imaging device; and
with a change in a read value of the read data output from the imaging device based on the irradiation with the invisible light, detecting the placement of the document.

15. A non-transitory recording medium storing a plurality of instructions which, when executed by one or more processors, causes the processors to perform a method of detecting placement of a document with a document placement detecting device, the document placement detecting device including a document table and a plate, the document table transmitting light, and the plate being openable and closable relative to the document table and covering the document table in a closed state of the plate,
the method comprising:
irradiating a placement area with invisible light via the document table, the placement area being an area of the document table on which the document is placed;
receiving reflected light from the document with an imaging device;
outputting read data from the imaging device; and
with a change in a read value of the read data output from the imaging device based on the irradiation with the invisible light, detecting the placement of the document.

* * * * *